United States Patent
Mullis et al.

(10) Patent No.: US 7,266,190 B1
(45) Date of Patent: Sep. 4, 2007

(54) SYSTEM AND METHOD FOR MANAGING COMMUNICATIONS

(75) Inventors: Karen Mullis, Loganville, GA (US); Anita Hogans Simpson, Decatur, GA (US)

(73) Assignee: AT&T Intellectual Property, Inc.

( * ) Notice: Subject to any disclaimer, the term of this patent is extended or adjusted under 35 U.S.C. 154(b) by 811 days.

(21) Appl. No.: 10/108,347

(22) Filed: Mar. 29, 2002

(51) Int. Cl.
*H04M 3/42* (2006.01)

(52) U.S. Cl. ............... 379/211.02; 379/210.02

(58) Field of Classification Search ............ 379/88.19, 379/88.2, 88.21, 88.22, 201.01, 201.02, 207.13, 379/208.01, 211.01, 211.02, 215.01, 210.02, 379/93.17
See application file for complete search history.

(56) References Cited

U.S. PATENT DOCUMENTS

| | | |
|---|---|---|
| 4,634,811 A | 1/1987 | Curtin et al. |
| 4,825,462 A | 4/1989 | Lewiner |
| 5,329,578 A | 7/1994 | Brennan et al. |
| 5,388,150 A | 2/1995 | Schneyer et al. |
| 5,440,620 A | 8/1995 | Slusky |
| 5,467,388 A | 11/1995 | Redd, Jr. |
| 5,497,414 A | 3/1996 | Bartholomew |
| 5,579,379 A | 11/1996 | D'Amico et al |
| 5,651,053 A * | 7/1997 | Mitchell ............ 379/210.02 |
| 5,651,055 A | 7/1997 | Argade |
| 5,701,301 A | 12/1997 | Weisser, Jr. |
| 5,757,899 A | 5/1998 | Boulware et al. |
| 5,805,587 A | 9/1998 | Norris |
| 5,809,114 A | 9/1998 | Solomon |
| 5,812,656 A | 9/1998 | Garland |
| 5,838,774 A | 11/1998 | Weisser, Jr. |
| 5,867,562 A | 2/1999 | Scherer |
| 5,907,604 A | 5/1999 | Hsu |
| 5,946,381 A | 8/1999 | Danne et al. |
| 5,946,386 A | 8/1999 | Rogers |
| 5,999,611 A | 12/1999 | Tatchell |
| 5,999,613 A * | 12/1999 | Nabkel et al. ......... 379/215.01 |
| 6,047,057 A * | 4/2000 | Weishut et al. ........ 379/215.01 |
| 6,078,581 A | 6/2000 | Shtivelman |
| 6,115,457 A | 9/2000 | Holiday et al. |
| 6,141,339 A | 10/2000 | Kaplan |
| 6,160,877 A | 12/2000 | Tatchell et al. |
| 6,208,726 B1 | 3/2001 | Bansal et al. |
| 6,219,413 B1 | 4/2001 | Burg |
| 6,243,459 B1 | 6/2001 | Cannon |
| 6,253,249 B1 | 6/2001 | Belzile |
| 6,259,692 B1 | 7/2001 | Shtivelman |
| 6,289,092 B1 | 9/2001 | Nishiara |
| 6,295,355 B1 | 9/2001 | O'Neal |

(Continued)

OTHER PUBLICATIONS

ADSL 98-107 "Core Network Architectures for ADSL", Access Systems, Mar. 1998.

(Continued)

*Primary Examiner*—Fan Tsang
*Assistant Examiner*—Simon Sing
(74) *Attorney, Agent, or Firm*—Withers & Keys, LLC

(57) ABSTRACT

A communications network-based system and service is disclosed. The service permits subscribers to control and manage incoming telephone calls. Subscribers can establish preferences and set encumbrances. The service also connects calls to a called party otherwise prevented from receiving calls due to line encumbrances, permitting preselected or predesignated parties to by-pass line encumbrances.

24 Claims, 16 Drawing Sheets

U.S. PATENT DOCUMENTS

| | | |
|---|---|---|
| 6,304,565 B1 | 10/2001 | Ramamurthy |
| 6,353,663 B1 | 3/2002 | Stevens et al. |
| 6,363,017 B2 | 3/2002 | Galvin |
| 6,366,661 B1 | 4/2002 | Devillier |
| 6,404,860 B1 | 6/2002 | Casellini |
| 6,430,185 B1 | 8/2002 | Kerns et al. |
| 6,459,706 B1 | 10/2002 | Hayasaka |
| 6,459,913 B2 | 10/2002 | Cloutier |
| 6,493,348 B1 | 12/2002 | Gelman |
| 6,519,331 B1 | 2/2003 | Stevens et al. |
| 6,542,596 B1 | 4/2003 | Hill et al. |
| 6,647,108 B1 | 11/2003 | Wurster et al. |
| 6,724,872 B1 | 4/2004 | Moore et al. |
| 6,724,878 B2 | 4/2004 | Burg |
| 6,775,370 B2 | 8/2004 | Burg |
| 6,950,402 B2 | 9/2005 | Mishra |
| 2002/0064272 A1 | 5/2002 | Naghi |
| 2002/0076022 A1 | 6/2002 | Bedingfield |
| 2002/0080944 A1 | 6/2002 | Bedingfield |
| 2002/0126818 A1 | 9/2002 | Cai et al. |
| 2002/0146107 A1* | 10/2002 | Baals et al. ............ 379/215.01 |
| 2003/0076941 A1* | 4/2003 | Tiliks et al. ................ 379/196 |
| 2003/0112930 A1 | 6/2003 | Bosick |
| 2003/0142807 A1 | 7/2003 | Dolan |

OTHER PUBLICATIONS

Andrew S. Tanebaum, Computer Network, Pretence Hall, (3rd ed. 1996).

K.R. Frank, et al., "Fast Access ADSL Architecture Description," TM-ATSEC-01-98-084.

U.S. Appl. No. 09/372,746, filed Aug. 10, 1999.

U.S. Appl. No. 09/372,676, filed Aug. 12, 1999.

U.S. Appl. No. 09/454,917, filed Dec. 6, 1999.

U.S. Appl. No. 09/456,316, filed Dec. 8, 1999.

U.S. Appl. No. 10/108,706, filed Mar. 29, 2002.

U.S. Appl. No. 10/183,850, filed Jun. 28, 2002.

U.S. Appl. No. 10/183,388, filed Jun. 28, 2002.

U.S. Appl. No. 113,698, filed Mar. 30, 2002.

www.paulbunyan.net/telephone/rates/features/selectcallaccept.html , 2001, 1 page.

www.granitestatetelephone.com/sfh_selacc.html, 2002, 2 pages.

* cited by examiner

SYSTEM AND METHOD FOR MANAGING COMMUNICATIONS

BACKGROUND

1. Field of the Invention

The present invention relates to a system and method for managing communications.

2. Background of the Invention

Many telephone customers do not wish to be disturbed by unwanted telephone calls. In an effort to prevent disruptive telephone calls, many customers subscribe to services provided by service providers that restrict calls from being connected to the subscriber. Some of these services prevent all calls from being connected to the subscriber, such as call-forwarding. One of the problems with these services is that they prevent calls from being connected that the subscriber may want to take.

Other services prevent all calls from being connected unless the subscriber takes the effort, after the call has been made, to agree accept the call. In order to receive calls, the subscriber may be required to answer a call from the service provider, listen to a message from the calling party to determine who is calling, and tell the service provider that the call can be connected. Not only can this be irritating, it may also inform the calling party that the subscriber is home and does not wish to speak to the calling party. It can also be embarrassing when the called party knows the calling party but refuses to take to call. Generally, this arrangement wastes time because it requires excessive participation of the subscriber.

Further, even without subscribing to such a service, many telephone customers miss important calls and are not connected to calling parties that they wish to be connected for various reasons. One such example is when the customer is already on the line. Typically in such a case, the feature the service provider provides is to play a busy signal to the calling party and to not connect the calling party. Another typical feature, sometimes called "call waiting," informs the customer that he or she has received another call. One problem with this feature, however, is that the customer first has to talk with the calling party without knowing whether or not the customer wishes to take the call.

SUMMARY OF THE INVENTION

The present invention is directed to managing communications by connecting calls to a telephone that otherwise would not automatically accept connection of a call. The communications network does so by connecting calls made from a calling party to a called party if the calling party's number is on an encumbered-line bypass list.

In another aspect, the communications network includes an intelligent communications network that includes three communications network elements and a database.

In another aspect, the communications network allows a subscriber of the encumbered-line bypass feature to provision his or her preferences through an interface system and method.

In still another aspect, the communications network allows a subscriber of the encumbered-line bypass feature to provision his or her preferences through an interactive voice response system and method.

Additional features and advantages of the invention will be set forth in the description that follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE INVENTION

Figure 1:
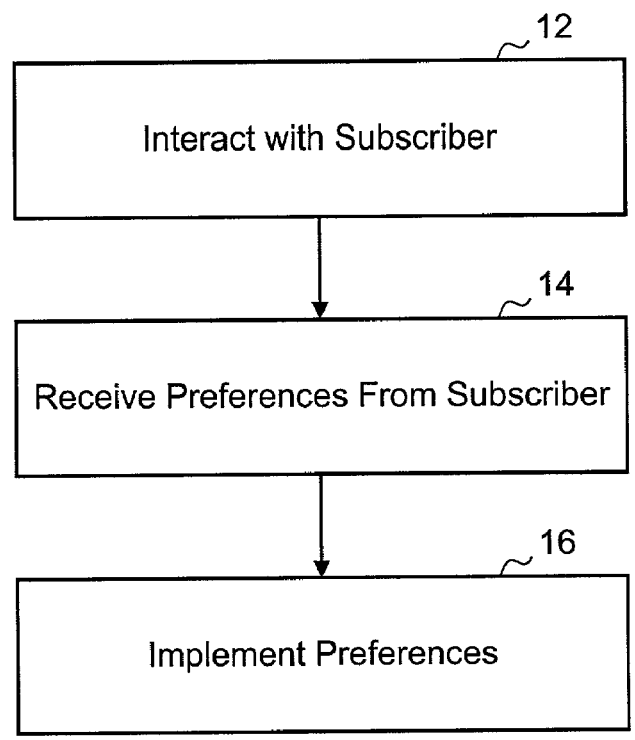
FIG. 1 is a flow diagram of a preferred embodiment of a method in accordance with the present invention.
Figure 5:
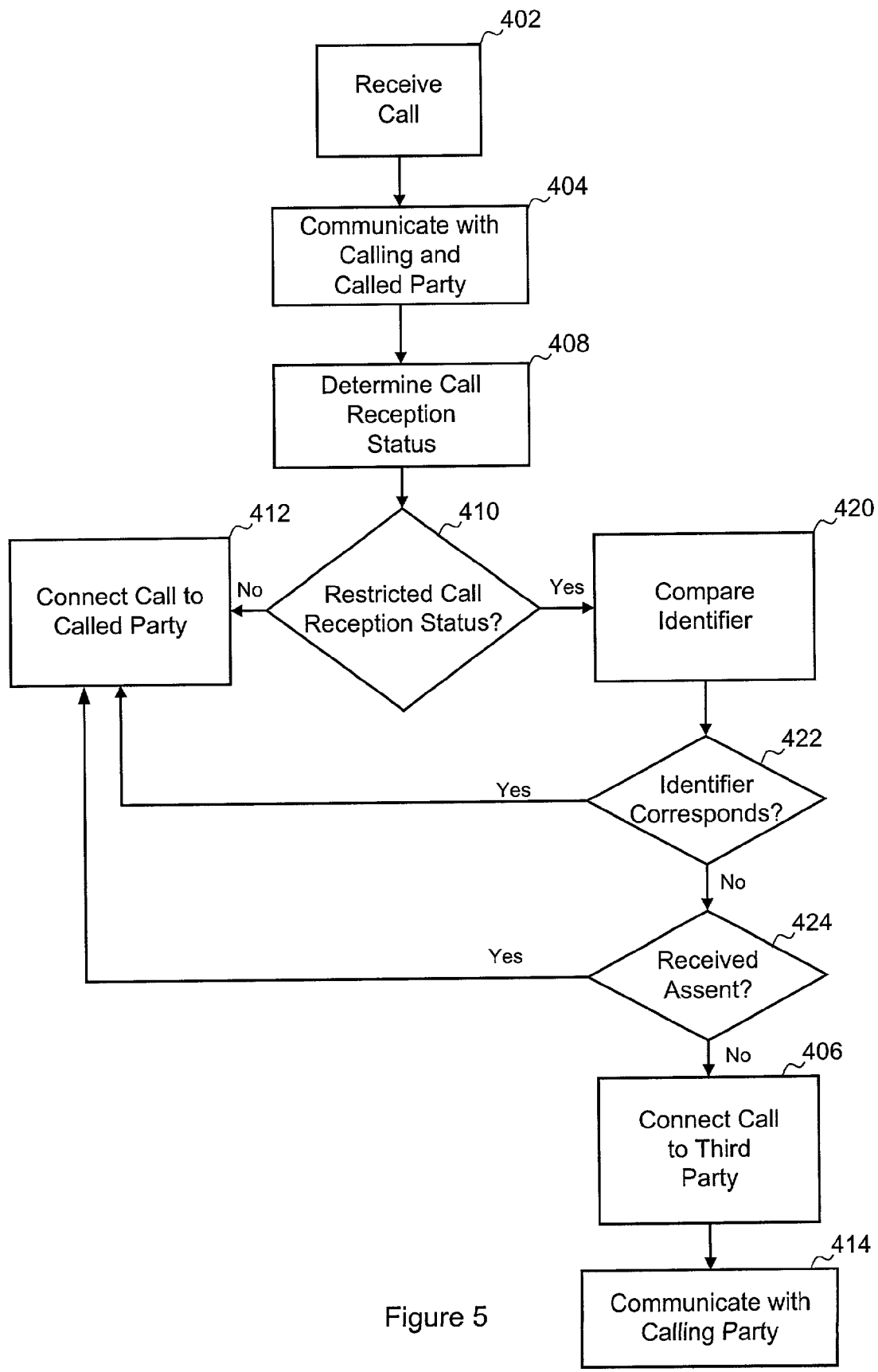
FIG. 5 is a flow diagram of a preferred embodiment of a method in accordance with the present invention.

For clarity and to facilitate an understanding of the preferred methods shown in connection with FIG. 5, this description includes an overview of a preferred embodiment of a method as set forth in FIG. 1.

FIG. 1 is a flow diagram of a preferred embodiment of a method in accordance with the present invention. Generally, this preferred method provides the method by which a system communicates with a subscriber of one or more services to receive and implement the subscriber's preferences for the services. Many different systems and platforms could be used to implement this method and the methods described below. For clarity, however, the below description uses a communications network as an example of one of the many possible systems or platforms.

In step 12, the communications network interacts with the subscriber of the services. These services may include a restricted status service and other services. In an exemplary embodiment, any of these services may also include an encumbered-line bypass list. These services and the encumbered-line bypass list are discussed in detail below.

Also as discussed below, the communications network preferably interacts with the subscriber by receiving a call into an interactive voice response (IVR) system. In an exemplary embodiment, the communications network interacts with the subscriber through an interface system. In another exemplary embodiment, the interface system may include a web interface. Through these or other interactions, the communications network proceeds according to step 14 to receive preferences from the subscriber. These preferences may include many different choices, features, and options, many of which are discussed below.

Figure 9:
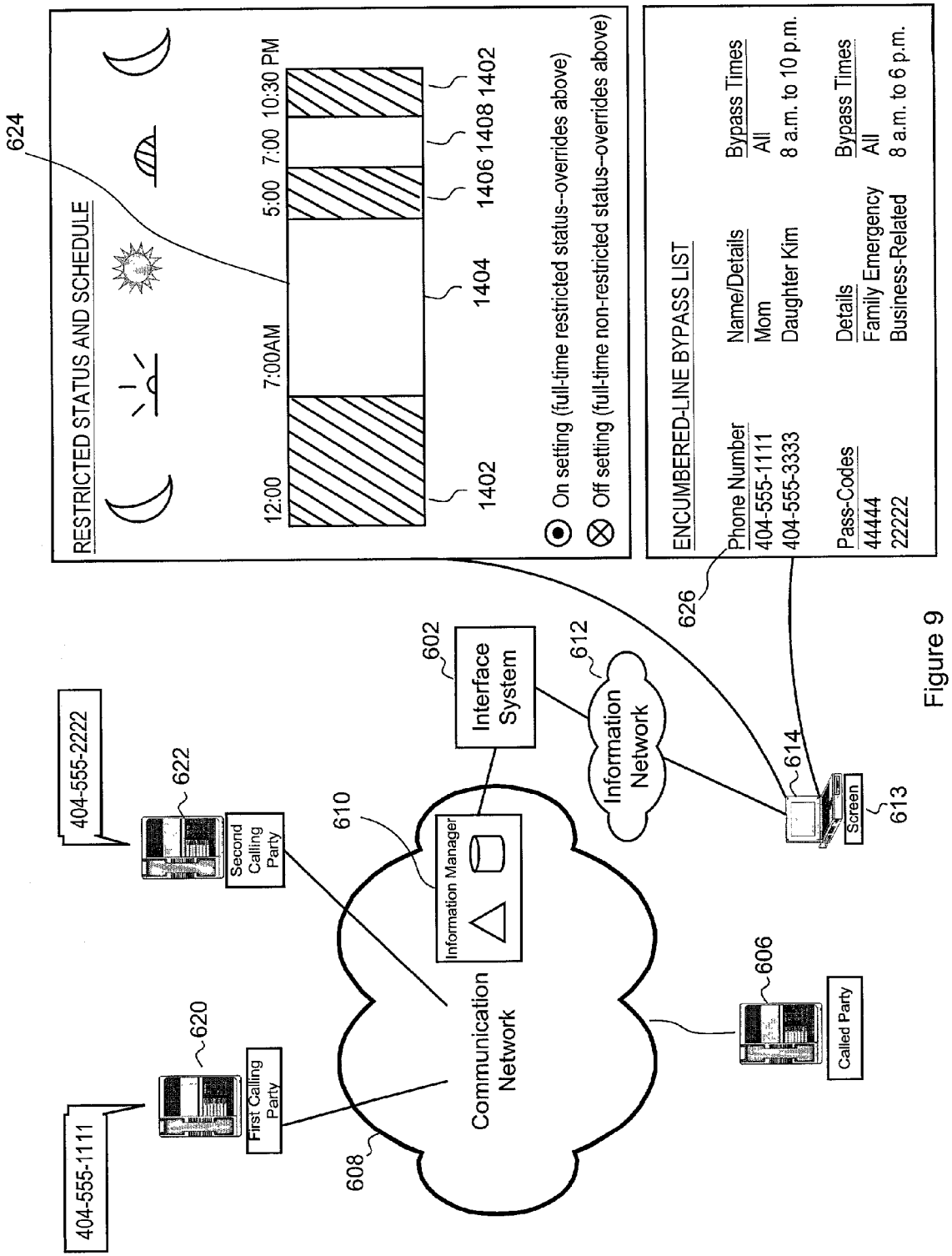
FIG. 9 is a schematic diagram of a preferred embodiment of an interface system in accordance with the present invention.

In step 16, the communications network implements the subscriber's preferences. By so doing, the communications network may serve the subscriber according to the subscriber's preferences. For the restricted status service, for example, the subscriber could set his or her preferences to a default restricted call reception status lasting from 5 p.m. to 7 p.m. weekdays. An exemplary embodiment of this preference is shown in FIG. 9, time period 1406, for a particular weekday. If the subscriber set this for a 5 p.m. to 7 p.m. time period as the subscriber's preference, the communications network generally will prevent calls from ringing to the subscriber's landline, home telephone Monday through Friday from 5 p.m. to 7 p.m.

As an additional example, the subscriber could set his or her preferences to a restricted call reception status lasting from 5 p.m. to 7 p.m. weekdays and from 10:30 p.m. to 7 a.m. all days. An exemplary embodiment of these preferences is shown in FIG. 9, time periods 1406 and 1402, for a particular weekday. Also, the subscriber could, for example, include two phone numbers (e.g., the subscriber's mother and daughter) on an encumbered-line bypass list; one number (e.g., the subscriber's daughter) allowed to bypass a restricted call reception status from 8 a.m. to 10 p.m. and one phone number (e.g., the subscriber's mother) for all times. By so doing, the communications network would prevent all calls from ringing to the subscriber's landline, home telephone from Monday through Friday from 5 p.m. to 7 p.m. except calls from the subscriber's mother and sister.

Also by so doing, the communications network would prevent all calls from ringing to the subscriber's landline, home telephone every day from 10:30 p.m. to 7 a.m. except calls from the subscriber's mother.

In the exemplary embodiment shown in FIG. 9 for time periods 1404 and 1408, the communications network would not prevent calls from ringing to the subscriber's landline, home telephone during time periods 1404 and 1408.

In a another example, the subscriber could set his or her preferences to an on setting, thereby overriding the restricted status time periods in graph 624 and thereby setting a restricted call reception status lasting 24 hours a day, every day of the week. Drawing from a previous example and the encumbered-line bypass list shown in FIG. 9, the subscriber's mom would bypass 24 hours a day, and the subscriber's daughter would bypass from 8 a.m. to 10 p.m. Calling parties using pass-code 44444 would bypass 24 hours a day. Calling parties using pass-code 22222 would bypass from 8 a.m. to 6 p.m.

In a another example, the subscriber could set his or her preferences to an off setting, thereby overriding the restricted status time periods in graph 624 and thereby setting a non-restricted call reception status lasting 24 hours a day, every day of the week. With this setting, the subscriber's landline, home telephone would not have any time periods with a restricted status.

These examples above are set forth simply to further explain the overview given above. These two possible scenarios for a subscriber's preferences are for one service, the restricted status service, and should not be deemed in any way limiting of the restricted status service or any other service. Many other preferences are possible, many of which are set forth below.

Figure 2:
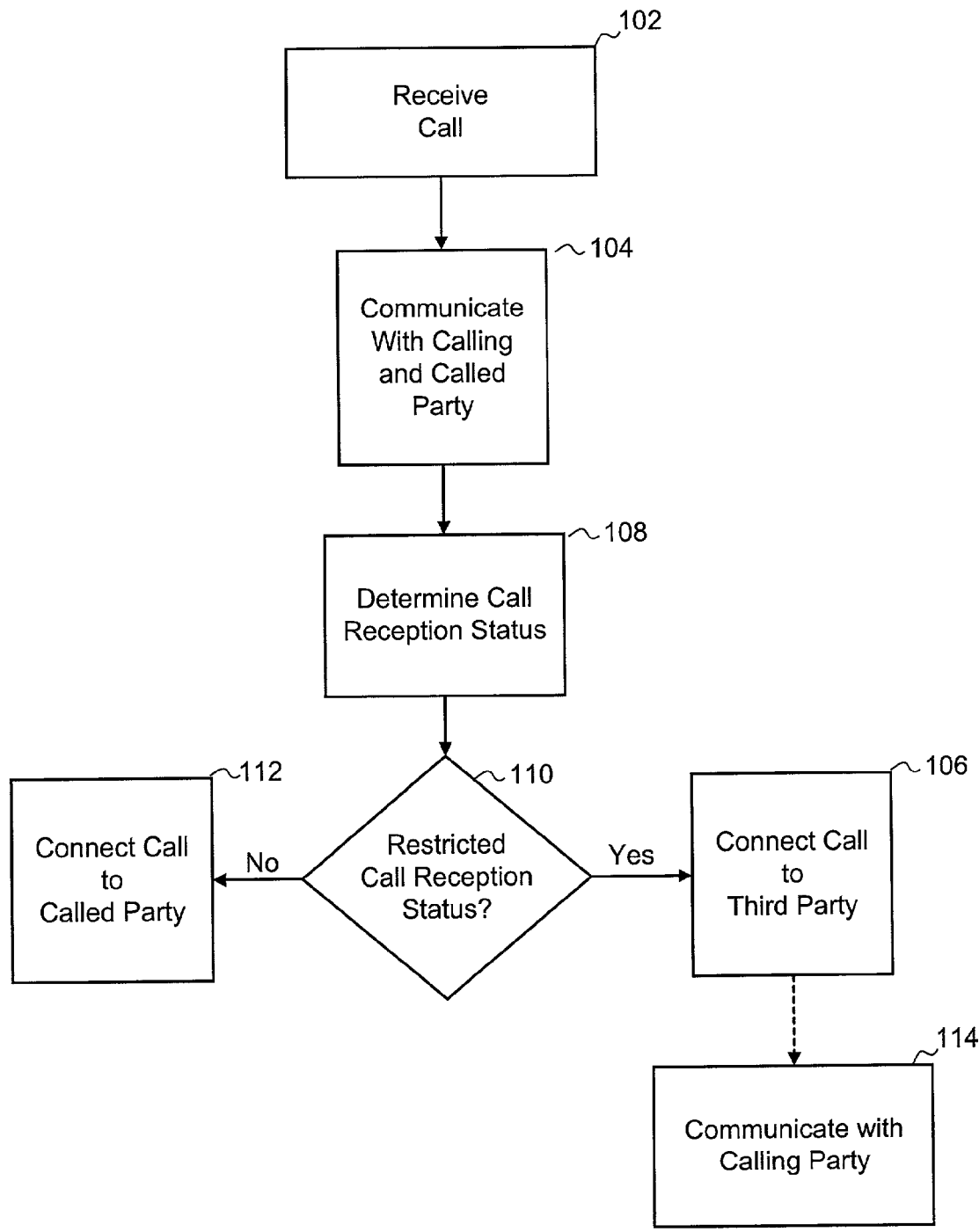
FIG. 2 is a flow diagram of a preferred embodiment of a method in accordance with the present invention.

FIG. 2 is a flow diagram of a preferred embodiment of a method in accordance with the present invention. This preferred embodiment sets forth, in part, a method showing how the communications network may proceed to prevent calls from ringing to the home, land-line telephone of a called party that is a subscriber of a restricted status service. For clarity, the below description often uses a called party 448 shown in FIG. 6 as an example.

In step 102 of FIG. 2, the communications network receives a call from a calling party. For clarity, the below description often uses a calling party 442 shown in FIG. 6 as an example. The communications network is preferably an intelligent communications network and, in an exemplary embodiment, an advanced intelligent communications network. In one embodiment, the communications network is an intelligent communications network shown in FIG. 7, comprising three communications network elements, 504, 506, and 508, and a database 502. Many different systems and platforms could be used to implement this method and the methods described below. For clarity, however, the below description often uses a communications network 450 in FIG. 6 as an example of one of the many possible systems or platforms.

The call received by communications network 450 from calling party 442 may be received by communications network 450 through a telephone landline, a cellular system, voice-over-internet, or other types of communication.

Typically, when calling party 442 makes the call, calling party 442 desires to be connected to called party 448. A non-limiting example of this common practice is: someone dials another person's phone number. If Jane, for instance, wants to call Bill, she picks up her phone (cell phone, landline phone, hand-held text-based device, or what-have-you) and dials Bill's number. Jane is trying to be connected to Bill's phone.

Called party 448 may be a subscriber of the restricted status service, however, which may or may not be set to prohibit calls at the time calling party 442 calls. The restricted status service, when it prohibits calls, is encumbering called party 448's telephone line. For the restricted status service and other encumbrances, calling party 442's call may be treated by communications network 450 as a request by calling party 442 to be connected to called party 448.

Communications network 450 to which calling party 442 is connected may determine not to connect calling party 442 to called party 448. Communications network 450 may instead connect the call to someone or something, such as a third party, other than called party 448. For clarity, the below description often uses a third party 446 shown in FIG. 6 as an example.

Preferably, before communications network 450 determines whether or not to connect calling party 442 to called party 448, communications network 450 communicates with calling party 442 and called party 448 according to step 104. Communications network 450 also preferably communicates with called party 448 using out-of-band signaling.

Figure 4:
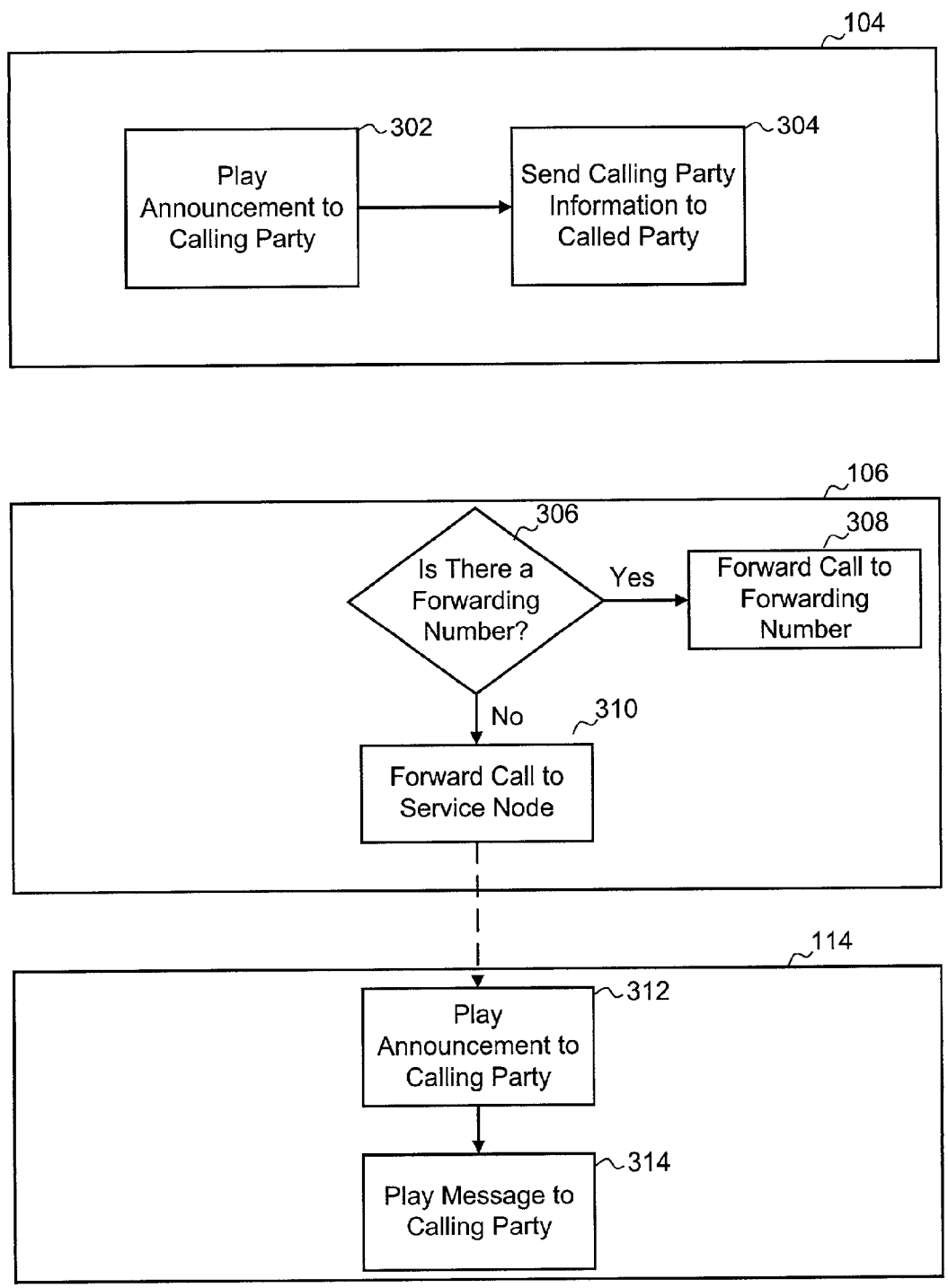
FIG. 4 is a schematic diagram of preferred embodiments of three steps in accordance with the present invention.

In one embodiment of the invention, step 104 is performed as shown, in part, through FIG. 4. FIG. 4 sets forth, in part, a flow diagram of this embodiment of step 104. In this embodiment, as part of this communication step 104, communications network 450 communicates with calling party 442 according to step 302. This communication may take the form of playing an audible ring announcement, or some other announcement or message set forth herein, such as: a busy signal; an announcement informing calling party 442 that called party 448 is not accepting calls; an announcement informing calling party 442 to call back at some other time; an announcement customized by called party 448, which may include called party 448's voice; a standard audio announcement; or another announcement.

The audible ring announcement informs calling party 442 that communications network 450 is working on the call. This audible ring announcement may also lead calling party 442 to believe that communications network 450 has connected calling party 442 to called party 448. By playing this audible ring announcement, calling party 442 may believe that he or she is connected to called party 448 and thus is waiting for called party 448 to pick up. In other embodiments, the announcement may not be an audible ring announcement, but rather another tone, no tone at all, or an announcement or message set forth above.

In another embodiment, also shown in FIG. 4, as part of this communication step 104, communications network 450 communicates with called party 448 according to step 304. In this embodiment, communications network 450 preferably communicates one or more identifiers related to calling party 442 to called party 448. These identifiers may include calling party 442's phone number, calling party 442's name, the time calling party 442 called, and/or whatever identifiers or other information is available to communications network 450. Communications network 450 can communicate one, several, or all of the identifiers to called party 448.

In another embodiment, communications network 450 communicates to called party 448, step 104, inaudibly.

In still another embodiment, communications network 450 communicates to called party 448, step 104, using a text-based display, such as a liquid crystal display.

In still another embodiment of this communication step 104, shown in step 304, communications network 450 communicates data about calling party 442 that was input by calling party 442. This data could include a voice entry, such as calling party 442 saying their name, or a pass-code (input by voice, key pad, or otherwise), or other data. The passcode and input data can be identifiers associated with calling party 442 and will be discussed further below.

As set forth in FIG. 2, after or simultaneously with communicating with called party 448 and calling party 442 according to step 104, or simply after step 102 if step 104 is not performed, communications network 450 determines the call reception status, step 108, of called party 448. In doing so, communications network 450 is working to protect called party 448 from unwanted calls and/or other audible disturbances.

Figure 3:
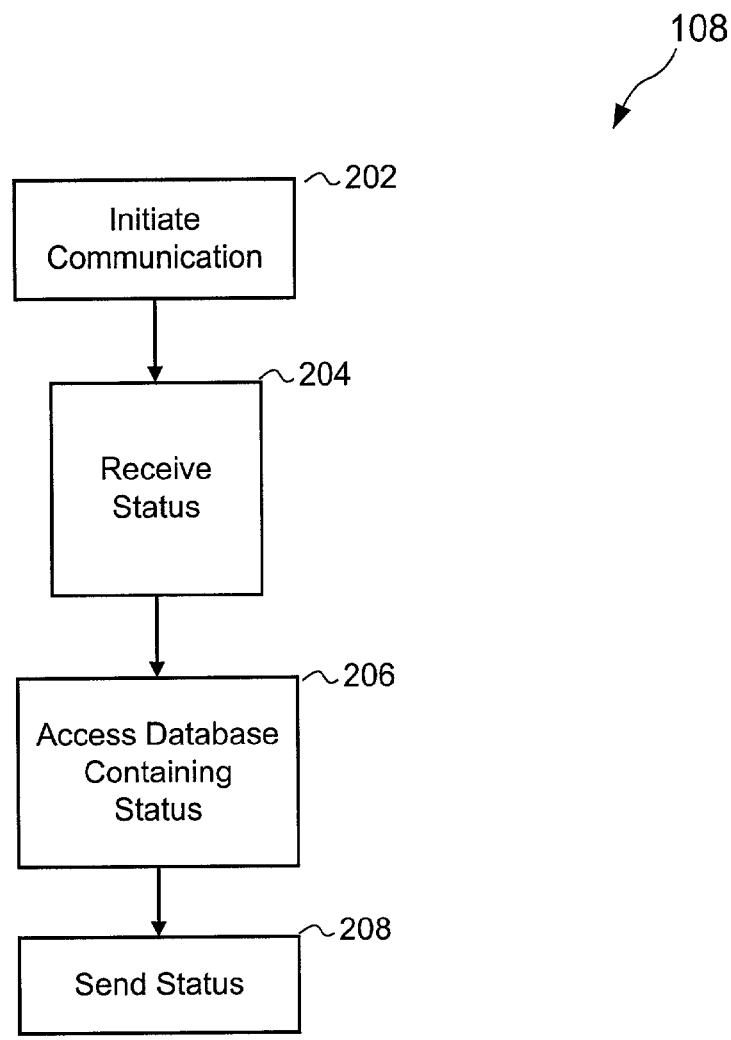
FIG. 3 is a flow diagram of a preferred embodiment of a determine call reception status step in accordance with the present invention.

In one embodiment of the invention, step 108 is performed as shown in part through FIG. 3. FIG. 3 is a flow diagram of this embodiment of step 108. In this embodiment, communications network 450 begins by initiating communication, step 202, between communications network elements within communications network 450. This communication preferably is made through out-of-band signaling. In an exemplary embodiment, a signaling system with a dedicated 64 kilobit data circuit (SS7) is used.

Figure 7:
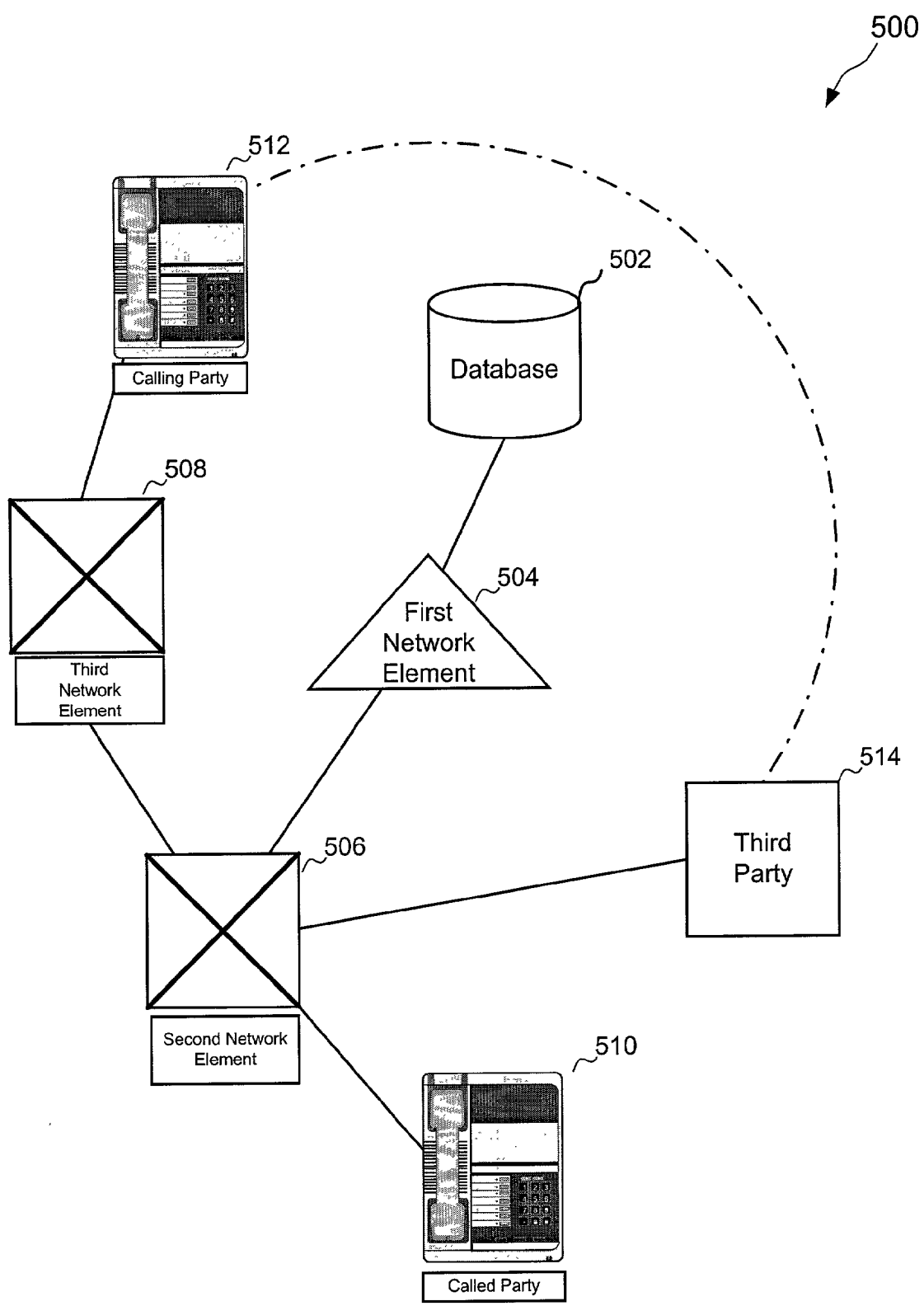
FIG. 7 is a schematic diagram of an exemplary embodiment of a system usable with a service in accordance with the present invention.

These communications network elements are preferably first communications network element 504 and second communications network element 506, as set forth in FIG. 7. Also preferably, first communications network element 504 is a Service Control Point (SCP) and second communications network element 506 is a Service Switching Point (SSP).

With communications network elements, communications network 450 determines whether or not to connect the call to called party 448 or third party 446. This flow process shown in FIG. 3 is set out for clarity in explaining one particular embodiment in which to determine to which party communications network 450 should connect the call from calling party 442, but should not be construed as limiting the present invention.

In this preferred embodiment of the invention, one communications network element communicates a query for status, step 204. Preferably this communication is in the form of a TAT trigger and a TCAP message. This query for status, step 204, prompts another communications network element to access a database containing a call reception status, step 206. In an exemplary embodiment, the database is database 502. For clarity, however, the below description often uses a database 444 shown in FIG. 6 as an example. Once the other communications network element determines called party 448's call reception status by accessing database 444, step 206, it sends the call reception status to communications network 450's element that sent the query, step 208.

In another embodiment, however, the other communications network element sends a command to communications network 450's element that sent the query, step 208. This command may include an instruction to connect or not to connect the call to called party 448, as well as other commands.

As generally set forth in FIG. 2, the call reception status of called party 448 is determined according to step 108. Based on the call reception status, communications network 450 connects the call to called party 448 or to third party 446 according to step 110.

In one embodiment, if the call reception status of called party 448 is a restricted call reception status, communications network 450 will connect the call to third party 446 according to step 106. Also in this embodiment, if the call reception status of called party 448 is not set, or is set to a non-restricted call reception status, communications network 450 connects the call to called party 448 according to step 112.

In one embodiment of the invention, step 106 is performed as shown, in part, through FIG. 4. FIG. 4 shows, in part, a flow diagram of this embodiment of step 106. In this embodiment, communications network 450 determines whether or not called party 448 has set a forwarding number, step 306. If called party 448 has set a forwarding number, or one is otherwise set, communications network 450 connects the call to the call forwarding number, step 308. (Called party 448 may also, in another embodiment, set the forwarding number after the call has been placed. This gives called party 448 the power to selectively forward calls to particular forwarding numbers.) The forwarding number may be a voicemail receiver, another phone number of called party 448, or otherwise.

Third party 446, in this case the call forwarding number, may, in some embodiments, be a voicemail number. If called party 448 has not set the forwarding number, or one is otherwise not set, communications network 450 connects the call to a communications network element, step 310. This communications network element may, in some cases, be third party 514 shown in FIG. 7, which preferably is a service node. This communications network element may also be a personal computer, a voice mark-up language web-server, an interactive voice response system, an intelligent peripheral, or other system capable of communicating with calling party 442. The call forwarding number may, in another embodiment, be set by called party 448 after calling party 442's call is received by communications network 450.

In cases where communications network 450 connects the call from calling party 442 to third party 446, step 106, communications network 450 may, in certain embodiments, communicate further with calling party 442, step 114.

In one embodiment of the invention, communications network 450 communicates with calling party 442 according to steps 312 and 314 of FIG. 4. FIG. 4 shows, in part, a flow diagram of one embodiment of step 114. In this embodiment, communications network 450 plays an announcement to calling party 442, step 312. The announcement may be of many different types. The types may include, for example, an audible ring announcement, where calling party 442 hears a telephone ring; sounds indicating that the call is connected to a party other than called party 448; or a busy signal. Preferably the announcement will be the audible ring announcement of a set number of rings, such as nine rings, before playing a message according to step 314. Communications network 450 does not need to play a message, and instead may continuing playing the announcement indefinitely, or may disconnect called party 448 after some period of time.

In another embodiment, communications network 450 plays a message to calling party 442, step 314, after, instead of, or as part of playing the announcement according to step 312. This message may inform calling party 442 that called party 448 is not available, called party 448 is busy, called party 448 has his or her preferences set to "restricted call reception status," or otherwise. Preferably the message announces that calling party 442 is not available after a certain number of rings but does not indicate that called party 448 is not accepting calls. Preferably communications network 450 plays messages through the service node.

In an exemplary embodiment, communications network 450 plays a message received from called party 448 prior to receiving the call from calling party 442. In this embodiment, called party 448 may pre-record one or more messages. These messages may be for different purposes, some played for only particular calling parties, some played only at particular times of the day or week, some played depending on whether or to whom called party 448 is connected, or a combination of these. For example, a message received by communications network 450 and recorded by called party 448 may announce that called party 448 is not receiving calls because it is dinner time and to call back after 7 p.m. In this example, called party 448 could choose, preferably prior to communications network 450 receiving the call from calling party 442, for that particular message to be played only to calling parties not on the encumbered-line bypass list and only from 5 to 7 p.m.

FIG. 5 is a flow diagram of another preferred embodiment of a method in accordance with the present invention. Similar to the embodiments set forth in FIGS. 2, 3 and 4, this preferred embodiment includes steps of receiving a call 402 and, usually, communicating with a calling and called party 404.

This preferred embodiment may be used in conjunction with determining a call reception status 408 and restricted call reception status 410. If used in conjunction with steps 408 and 410, the steps of compare identifier 420 and identifier corresponds 422 may follow, precede, or be simultaneous with steps 408 and 410. This preferred embodiment may also be used not in conjunction with determining a call reception status 408 and restricted call reception status 410.

In one embodiment, steps 402, 404, 408, and 410 are performed before the steps of compare identifier 420 and identifier corresponds 422. Timing of steps 420 and 422 could be performed in various orders; for clarity one order of steps are set forth in the flow diagram of FIG. 5.

In this embodiment, shown in part in FIG. 5, after determining that the call reception status is set to a restricted call reception status, step 408 and 410, communications network 450 compares one or more identifiers, step 420, of calling party 442. The identifiers may include any data related to calling party 442 or the phone number from which calling party 442 called. These identifiers may include: the phone number from which calling party 442 called; a pass-code entered by calling party 442 or attached to calling party 442 or the number from which calling party 442 called; voice-recognition data entered by calling party 442; data within the string of data received by communications network 450 when calling party 442 made the call; data related to calling party 442 or calling party 442's phone number known by or found out by communications network 450 by various means; or other data that identifies calling party 442.

Communications network 450 preferably performs compare identifier step 420 by comparing the identifier(s) with information within a database to determine if any identifier corresponds to the information. In one embodiment, this database is database 502. In another embodiment, this database is database 444 shown in FIG. 6. Preferably, the database used includes a CNAM (Caller ID with NAMe) database or can connect to a CNAM database in or accessible by communications network 450.

The information within database 444 may be any information by which communications network 450 may determine if the call from calling party 442 is desired by called party 448 to be connected to called party 448. In one embodiment the information is an encumbered-line bypass list and one of the identifier(s) is the phone number from which calling party 442 called. In another embodiment the information is an encumbered-line bypass list and one of the identifier(s) is a pass-code entered by calling party 442.

In this embodiment where one of the identifier(s) is a pass-code and the information is an encumbered-line bypass list, a calling party, even if his or her phone number is not on the encumbered-line bypass list, may enter a pass-code after making a call to called party 448. If the pass-code entered by calling party 442 matches a pass-code within the encumbered-line bypass list, communications network 450 may connect the call to called party 448 if called party 448 has not otherwise restricted the entered pass-code, such as by not allowing the call to bypass a restricted status or an encumbrance based on the time of day or week that communications network 450 received calling party 442's call.

While communications network 450 preferably performs this comparison by comparing the identifier(s) with information within database 444, communications network 450 may do so in other ways so long as these ways allow for communications network 450 to determine if one of the identifier(s) is recognized as one allowing for the call to be connected to called party 448. Communications network 450 also preferably performs this comparison using one or more communications network elements. In one embodiment, communications network 450 uses first communications network element 504. Preferably, first communications network element 504 is an SCP.

In another embodiment, second communications network element 506 communicates with first communications network element 504. These communications may take the form of a TAT trigger and a TCAP message. This communication between second communications network element 506 and first communications network element 504 may include communicating one of the identifier(s). These and all communications between communications network elements are preferably via out-of-band signaling. Communications between communications network elements are further preferred to follow SS7 protocol.

If communications network 450 compares one of the identifier(s), step 420, and it corresponds, step 422, communications network 450 connects the call to called party 448, step 412. If communications network 450 compares the identifier(s), step 420, and none correspond, step 422, communications network 450 connects the call to third party 446, step 406. As stated previously, third party 446 may include a forwarding number, a service node, or others.

In an exemplary embodiment, communications network 450 communicates with and waits to receive an assent from called party 448 to connect the call to called party 448 after performing step 422 and determining that the identifier(s) do not correspond. If communications network 450 communicates with called party 448 and does not receive the assent within a short time-period, communications network 450 proceeds to step 406. If communications network 450 communicates with called party 448 and does receive the assent within the short time-period, communications network 450 proceeds to step 412.

In another exemplary embodiment, communications network 450 communicates with and waits to receive an assent from called party 448 to connect the call to called party 448 or other instructions after performing step 422 and determining that the identifier does not correspond. These other instructions may include instructions to connect the call to a particular third party, step 406, or communicate a particular communication to calling party 442, step 414. If communications network 450 receives these other instructions, communications network 450 follows these other instructions as part of step 406 and/or step 414.

In some embodiments and usually in conjunction with connecting the call to third party 446, communications network 450 communicates with calling party 442, step 414. Communications network 450 may communicate with calling party 442, step 414, in those manners set forth above for step 114, as well as others. Communications network 450 preferably communicates with calling party 442, step 414, with a ring announcement followed by a message stating that called party 448 is not available.

In one embodiment, communications network 450 directs the call through two communications network elements. These communications network elements preferably are first communications network element 504 and second communications network element 506. Communications network 450, in this embodiment, may direct the call by the first communications network element 504 commanding the second communications network element 506 to connect the call to the called or third party. First communications network element 504 preferably is an SCP; second communications network element 506 preferably is an SSP.

Figure 6:
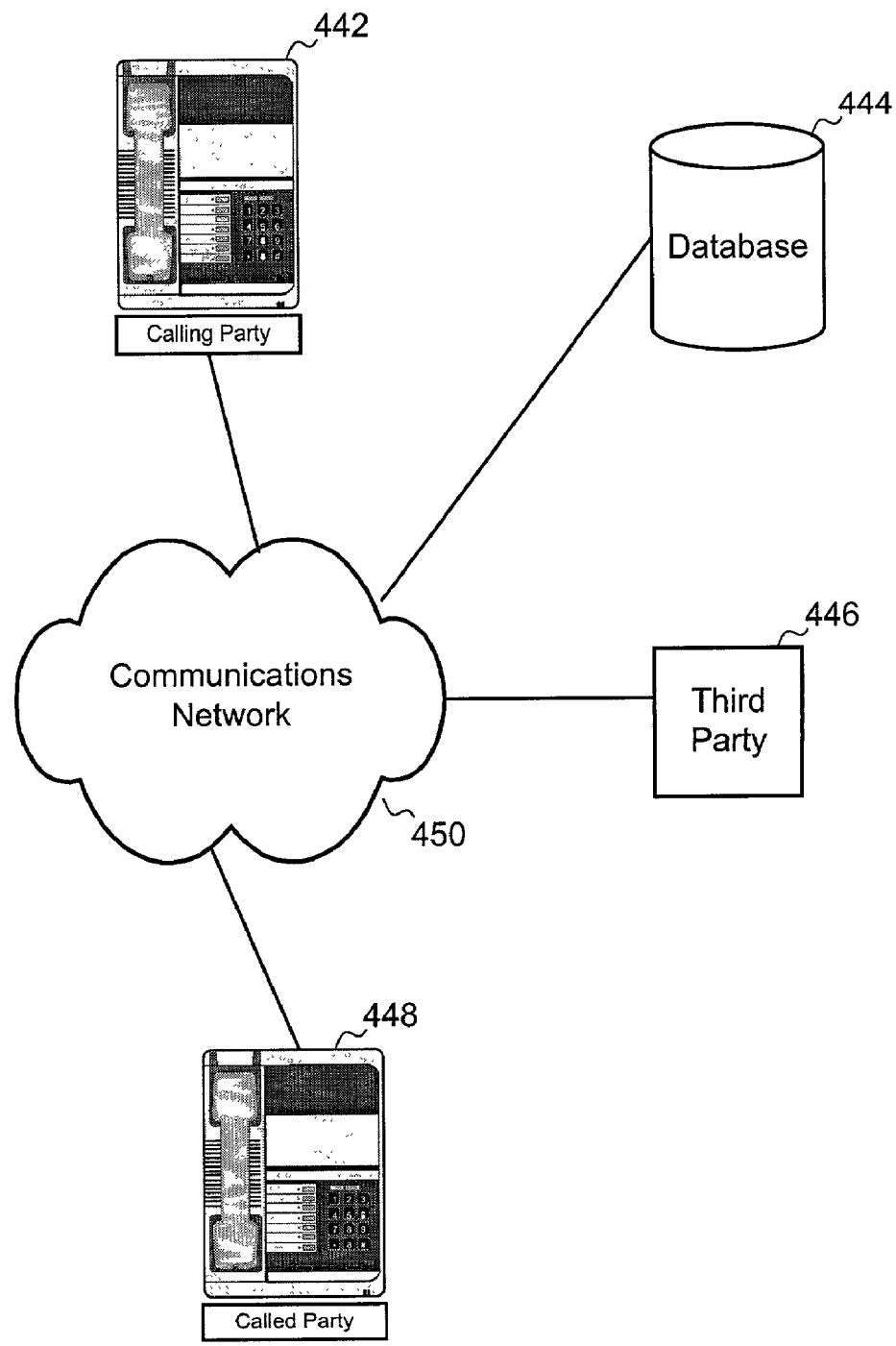
FIG. 6 is a schematic diagram of a preferred embodiment of a system usable with a service in accordance with the present invention.

FIG. 6 is a schematic diagram, portions of which show a preferred embodiment of the present invention. FIG. 6 sets forth a calling party 442, a database 444, a third party 446, a called party 448, and a communications network 450. Calling party 442, database 444, third party 446, and called party 448 are configured to communicate with communications network 450. Communications network 450 is configured to communicate with calling party 442, database 444, third party 446, and called party 448. Preferably communications network 450 is configured to receive a call from calling party 442 and then to communicate with database 444 to determine to where calling party 442 should be connected. Communications network 450 preferably is configured to connect calling party 442 to either called party 448 or third party 446 or disconnect the call. Database 444 and third party 446 are set out from communications network 450 for clarity, but may, in some embodiments, be part of communications network 450.

For example, if communications network 450 receives a call from calling party 442, who is attempting to call called part 448, communications network 450 communicates with database 444. For the restricted status service, communications network 450 is configured to communicate with database 444 to determine if called party 448 has set his or her preference to a restricted call reception status or a non-restricted call reception status.

Continuing the example, if database 444 does not show that called party 448 has set his or her call reception status set to a restricted call reception status, communications network 450 will connect calling party 442 to called party 448. If database 444 shows that called party 448 had set his or her call reception status to a restricted call reception status, communications network 450 will connect calling party 442 to third party 446 unless communications network 450 receives one or more identifiers related to calling party 442 that identifies calling party 442 as one that communications network 450 should connect by bypassing the restricted call reception status. If so, communications network 450 will connect calling party 442 to called party 448. This example is set forth for clarity in showing one possible usage of one embodiment of the invention. It should not be deemed limiting of this or any other embodiments.

FIG. 7 is a schematic diagram 500, portions of which show a preferred embodiment of the present invention. FIG. 7 sets forth multiple communications network elements 504, 506, and 508. These communications network elements are set out in this manner as a preferred embodiment of the present invention, and also as a clear way to explain the functioning of communications network 450 to which they may be a part. In other embodiments these communications network elements may be combined, or there may be fewer or additional communications network elements.

FIG. 7 sets forth the preferred embodiment of the present invention in part by setting forth a third communications network element 508, which is configured to communicate with a calling party 512 and a second communications network element 506. Preferably, third communications network element 508 is configured to communicate with calling party 512 and second communications network element 506 such that third communications network element 508 receives information from and sends information to calling party 512 and second communications network element 506. Third communications network element 508 may also be configured to connect the call to second communications network element 506.

In one embodiment, third communications network element 508 is configured to receive a call from calling party 512, which third communications network element 508 may connect to second communications network element 506. As part of the call, third communications network element 508 may create or receive identifiers of calling party 512, which are either intentionally input by calling party 512; unintentionally included, either in a string of data as part of the call or otherwise; as set forth above; or otherwise. Third communications network element 508 is preferably configured to communicate with the calling party, such as with an audible ring announcement, after receiving the call. Third communications network element 508, after receiving the call from calling party 512, preferably sends an announcement to calling party 512. This announcement is preferably a ring announcement.

FIG. 7 also sets forth the preferred embodiment of the present invention in part by setting forth a second communications network element 506, which is configured to communicate with third communications network element 508, a first communications network element 504, sometimes a third party 514, and called party 510. Second communications network element 506 communicates with third communications network element 508 as mentioned above as well as set forth below.

In some embodiments third communications network element 508 communicates identifiers of calling party 512 to second communications network element 506. In embodiments where third communications network element 508 communicates identifiers of calling party 512 to second communications network element 506, second communications network element 506 may, through communication with first communications network element 504 and indirectly with a database 502 (preferably including or connecting to a CNAM database), be configured to use such identifiers to determine whether to connect the call to called party 510 or third party 514.

In another embodiment, second communications network element 506 may, through communication with first communications network element 504 and indirectly with a database 502, be configured to determine whether to connect the call to called party 510 or third party 514. In this embodiment, second communications network element 506 preferably relays the identity of called party 510 to first communications network element 504. Second communications network element 506 preferably communicates with third communications network element 508 to gain the identity of called party 510, but may do so in any manner.

Second communications network element 506 also is configured to communicate in other manners with first communications network element 504. Preferably, second communications network element 506 communicates with first communications network element 504 through one or more queries. These queries may request information. Preferably these queries are communicated through a signaling function for communications network databases such as a Transaction Capabilities Application Part (TCAP). These queries may also include data and other information, such as the identity of called party 510, or various identifiers of calling party 512.

In one embodiment, these queries preferably request first communications network element 504 to determine, using the identity of called party 510, a call reception status of called party 510. With this call reception status, second communications network element 506 preferably may, either on its own or as a command from first communications network element 504, connect the call to called party 510 or third party 514.

In another embodiment, these queries preferably request first communications network element 504 to determine whether one or more of the identifiers of calling party 512 correspond to an encumbered-line bypass list. With this correspondence or lack of correspondence, second communications network element 506 preferably may, either on its own or as a command from first communications network element 504, connect the call to called party 510 or third party 514.

In still another embodiment, these queries request first communications network element 504 to determine, using the identity of called party 510 and identifiers of calling party 512, a call reception status of called party 510 and any correspondence between one or more identifiers of calling party 512 to an encumbered-line bypass list. With this call reception status and correspondence, second communications network element 506 preferably may, either on its own or as a command from first communications network element 504, connect the call to called party 510 or third party 514. First communications network element 504 may also be configured to connect the call to called party 510 or third party 514.

Preferably, second communications network element 506 connects the call to the called party if called party 510's call reception status is set to a non-restricted call reception status. Also preferably, second communications network element 506 connects the call to called party 510 if one or more of the identifiers of calling party 512 corresponds to information within the encumbered-line bypass list. Second communications network element 506 preferably connects the call to third party 514 in cases above where second communications network element 506 does not connect the call to called party 510, shown by the dashed line in FIG. 7.

Second communications network element 506 also is configured to communicate with third party 514, as set forth above and additionally below. Second communications network element 506 also may communicate with third party 514, providing information to third party 514, such as how long calling party 512 remains on the line, the calling party's phone number and name, and the like. Such information may be stored at third party 514. Second communications network element 506 preferably communicates with third party 514 to connect the call from calling party 512 to third party 514. Second communications network element 506 may also command third party 514 or third party 514 may be programmed to perform, in cases where third party 514 is a fourth communications network element or the service node, to play particular announcements or messages to calling party 512. Preferably, third party 514, when the fourth communications network element or the service node, plays a ring announcement, followed by a message. Preferably the message informs calling party 512 that called party 510 is not available. Third party 514 may, however, plays many types of messages, either chosen by communications network 450 or by called party 510.

Second communications network element 506 also is configured to communicate with called party 510, as set forth above and additionally. Second communications network element 506 preferably communicates identifiers of calling party 512 to called party 510. Second communications network element 506 does so preferably inaudibly so as not to disturb called party 510. In an exemplary embodiment, second communications network element 506 communicates identifiers of calling party 512 through a text-based display, such as a liquid crystal display. In another exemplary embodiment, second communications network element 506 communicates identifiers of calling party 512 through a test-based display without any audible communication, such as called party 512's phone ringing.

FIG. 7 also sets forth the preferred embodiment of the present invention in part by setting forth first communications network element 504, which is configured to communicate with second communications network element 506 and a database 502, and vice-versa. First communications network element 504 communicates with second communications network element 506 as mentioned above. First communications network element 504 also communicates with database 502. In one embodiment, first communications network element 504 preferably compares or has database 502 compare one or more identifiers of calling party 512 with information in the encumbered-line bypass list, which is contained with database 502. In another embodiment, first communications network element 504 preferably compares or has database 502 compare the identity of called party 510 to determine the call reception status of called party 510. In some embodiments, first communications network element 504 performs both of the above comparisons.

In the embodiment previously discussed, communications network 450 restricts calls from connecting to a called party that subscribes to the restricted status service. Communications network 450 also provides features where certain calls bypass the restricted status service, as well as other services and/or features that encumber a phone line, by connecting calls to the called party even though the called party's line is encumbered.

In other embodiments, first communications element 504 may include a personal computer, a voice mark-up language web-server, an interactive voice response system, or other system capable of performing the functions set forth for first communications element 504.

An encumbered line or line encumbrance is a line or a connection that is in a condition or state that is less than optimally available. Optimally available is a condition or state where access to the line is absolutely uninhibited. Some examples of encumbered lines include the following: a busy line, a line that is currently in use, a line that has been configured to prevent access by calling parties, a line where a service provider is controlling access to the line by preventing or modifying at least one calling party's ability to access, use, or connect with the encumbered line.

Figure 8:
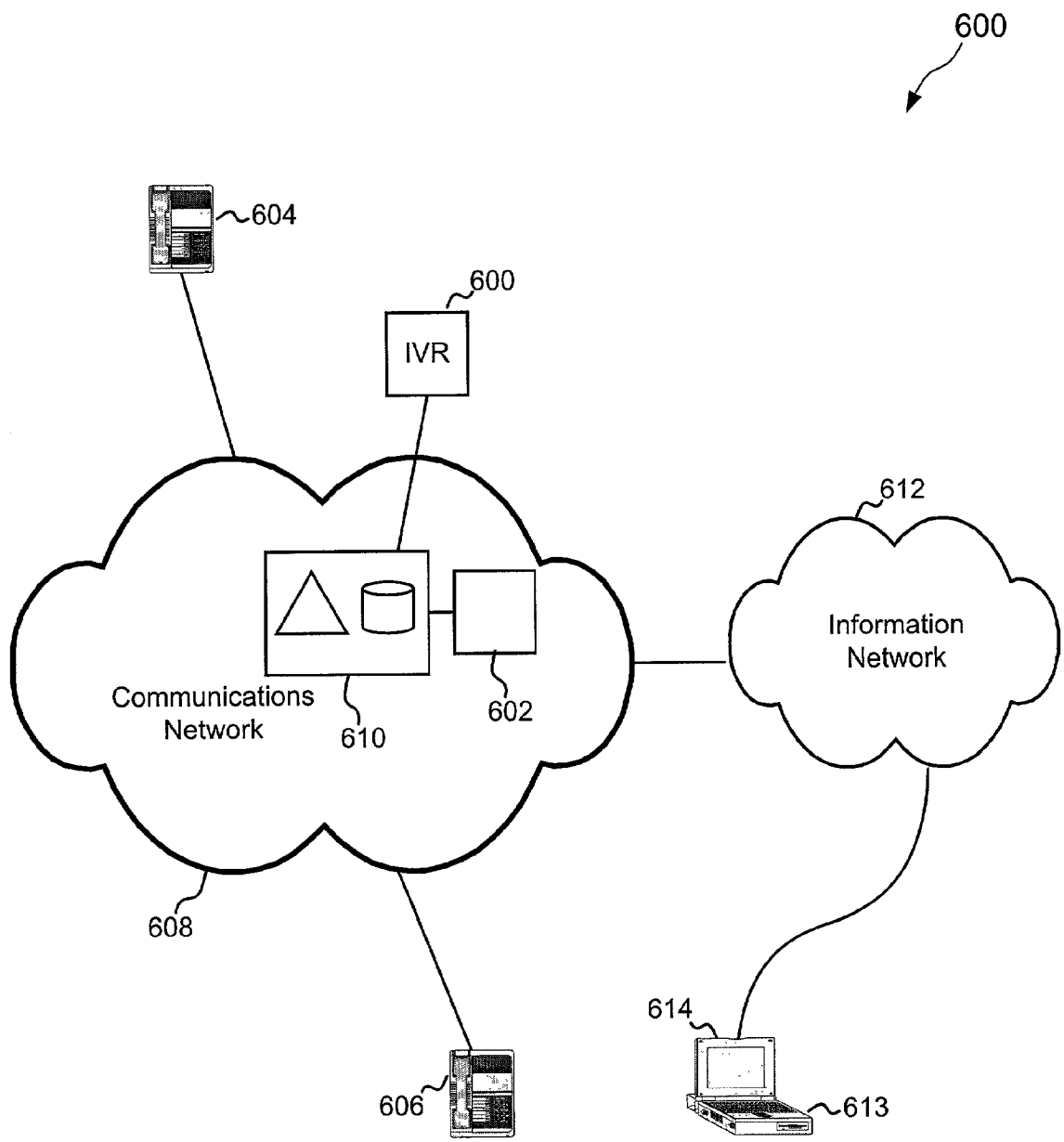
FIG. 8 is a schematic diagram of a preferred embodiment of an interface system in accordance with the present invention.

FIG. 8 and other figures described below set forth ways in which a subscriber of the encumbered-line bypass feature can provision his or her preferences for this feature. In an exemplary embodiment below, the figures and description describe how the subscriber can provision aspects of the encumbered-line bypass feature such as which calling party's calls are connected and during what times of the day or week. With these preferences provisioned, the communications network may selectively connect calls to the subscriber even when the subscriber's line is encumbered.

FIG. 8 is a schematic diagram, portions of which show a preferred embodiment of the present invention. FIG. 8 describes two systems by which a subscriber can provision his or her encumbered-line bypass feature, as well as the restricted status service and other communications services. Other systems could be used to provision these services and feature, but for clarity, FIG. 8 includes an interactive voice response (IVR) system 600 and an interface system 602.

Interface system 602 may be a computer system, one or more parts of a computer, one or more computers acting together, software on a computer or any other system that can manage information. Interface system 602 preferably is configured to allow a subscriber of restricted status, encumbered-line bypass, and/or other communications network services to receive and/or input information into an information manager 610. Preferably, interface system 602 includes a firewall. Interface system 602 preferably is a secure advanced intelligent communications network intranet. Interface system 602 may, however, be a secure intelligent communications network intranet, a secure communications network intranet, a secure intranet, an intranet, or any device capable of communicating information between communications network 608 and information network 612.

Interface system 602 preferably communicates information regarding status, settings and/or preferences and can also provide the information in a format appropriate for whatever device the subscriber is using. As an example, interface system 602 can display an existing encumbered-line bypass list of phone numbers and pass-codes in columns, allowing easy deletion from the list or adjustment to the details, bypass times, or other information related to each phone number and pass-code on the encumbered-line bypass list.

The following example, disclosed in connection with this embodiment, demonstrates features of the present invention. A calling party 604 calls a called party 606. A communications network 608 receives the call from calling party 604. After receiving the call, communications network 608 determines whether or not called party 606's line is encumbered. Communications network 608 preferably determines whether called party 606's line is encumbered. In some cases information manager 610 assists with this determination.

Information manager 610 may be a computer system, one or more parts of a computer, one or more computers acting together, software on a computer, or any other system that can manage information and is communication with communications network 608. In some cases information manager 610 can form a portion of communications network 608.

If communications network 608 determines that called party 606's line is encumbered, communications network 608 determines whether or not called party 606 subscribes to an encumbered-line bypass feature. Communications network 608 may determine whether called party 606 subscribes to the encumbered-line bypass feature before, after, or at the same time communications network 608 determines if called party 606's line is encumbered.

In this embodiment, if called party 606's line is encumbered and called party 606 subscribes to the encumbered-line bypass feature, communications network 608 determines whether or not calling party 604 may bypass the encumbrance and thus be connected to called party 606.

Communications network 608 preferably determines whether or not to connect calling party 604 based upon called party 606's preferences for the encumbered-line bypass feature.

Preferably before calling party 604 made the call to called party 606, however, called party 606 established his or her preferences and determined which calling parties would bypass an encumbrance to called party 606's line. In an exemplary embodiment, called party 606 may choose which parties would bypass and at what times of the day or week based on the phone number from which they call or their entry of a certain pass-code.

In a preferred embodiment, as shown in FIG. 8, called party 606 may provision his or her encumbered-line bypass feature through IVR system 600 and/or the interface system 602.

In one embodiment, called party 606 may contact IVR system 600 through a telephone call to the system, and through IVR system 600 set his or her preferences. These preferences may include phone numbers of potential calling parties that may bypass an encumbrance as well as pass-codes whereby calling parties may bypass an encumbrance. These preferences may also include times of the day that potential calling parties may bypass encumbrances and other times or days that certain potential calling parties may not bypass encumbrances.

In this embodiment, IVR system 600 communicates with information manager 610. Information manager 610 preferably is part of communications network 608. Information manager 610 may also be separate from communications network 608. Preferably communications network 608 may communicate with information manager 610 to determine the preferences of called party 606.

In another embodiment, called party 606 may contact interface system 602. Preferably called party 606 communicates with interface system 602 through an information network 612. Information network 612 may be a global Internet, an extranet, and intranet, or any other information network.

Called party 606 communicates with information network 612 with communication device 613. Communication device 613 may be a computer, a wireless device, or any device allowing a person to communicate with an information network. Preferably these devices allow for the display of a monitor screen 614.

Called party 606's preferences may include phone numbers of calling parties that may bypass an encumbrance as well as pass-codes whereby calling parties may bypass an encumbrance. These preferences may also include times of the day that potential calling parties may bypass encumbrances and other times or days that certain potential calling parties may not bypass encumbrances, well as other options.

With called party 606's preferences accessible by communications network 608, when calling party 604 calls and called party 606's line is encumbered, communications network 608 may, through communication with information manager 610, ascertain whether or not called party 606 wishes calling party 604 to be connected to called party 606's telephone line.

Figure 10:
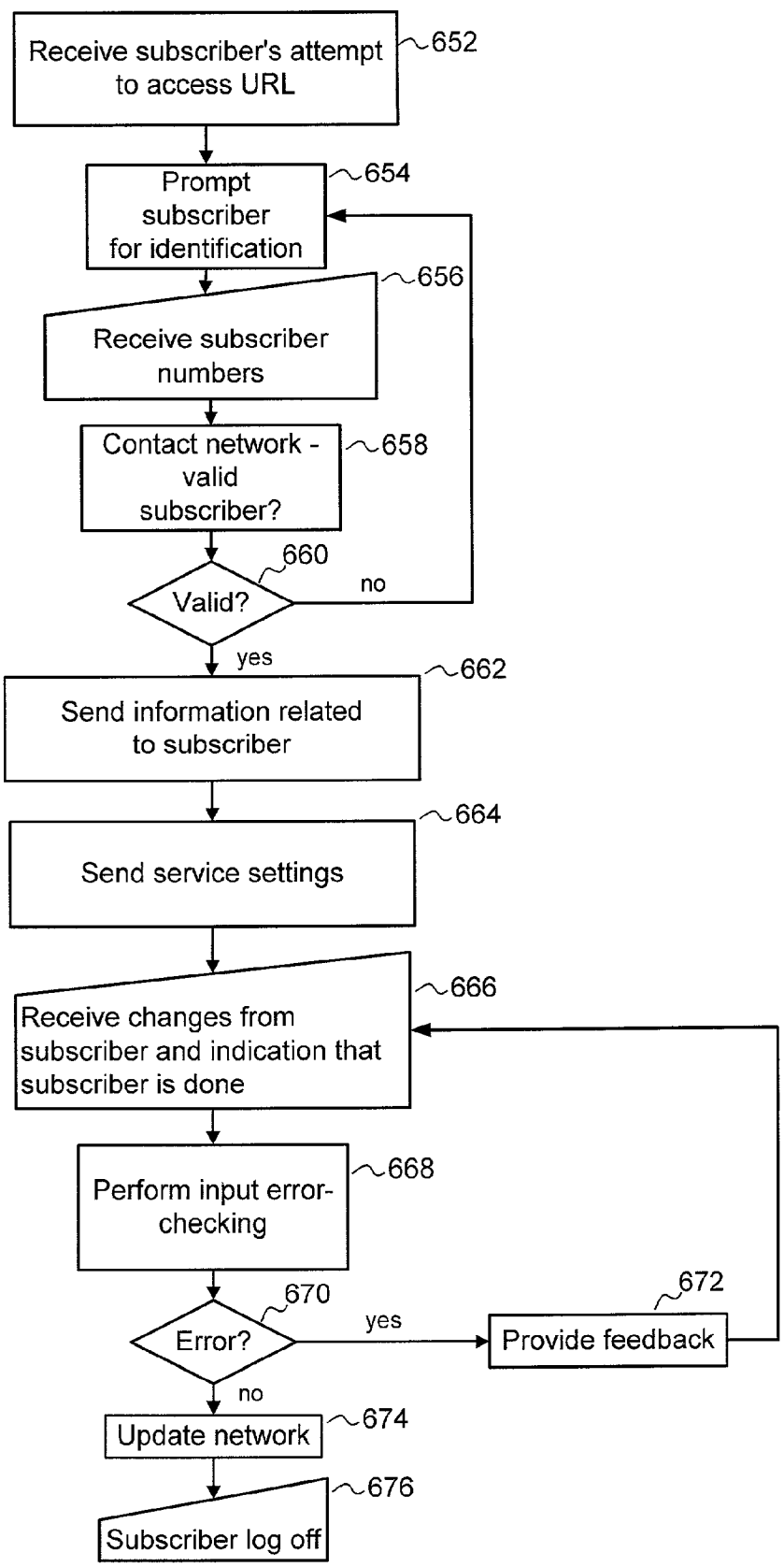
FIG. 10 is a flow diagram of a preferred embodiment of an interface system and method in accordance with the present invention.

FIG. 9 is a schematic diagram, portions of which show a preferred embodiment of the present invention. FIG. 10 describes, by way of example, an exemplary embodiment of interface system 602.

Preferably before a first calling party 620 or a second calling party 622 calls called party 606, called party 606 establishes his or her encumbered-line bypass features and options. Screen 614 shows an example of information sent from interface system 602 to called party 606's communication device 613.

In this embodiment, interface system 602 sends information to called party 606. Communication device 613 displays, through screen 614, called party 606's times of the day that called party 606's line is set to a restricted status or is otherwise encumbered. Screen 614 shows an exemplary embodiment, showing called party 606 a graph 624 of the hours in a day, including those where called party 606's line is encumbered and unencumbered. Screen 614 also shows an "on setting" and an "off setting," either of which may be used to override the restricted and non-restricted statuses shown in graph 624. Preferably interface system 602 sends information such that communication device 613 displays this graph in varying colors, such that called party 606 may easily discern which times of the day called party 606's line is encumbered.

In the example show in graph 624, called party 606's line is encumbered from 10:30 p.m. to 7:00 a.m. and from 5:00 p.m. to 7:00 p.m. Neither the on setting or the off setting are chosen. Recall that one example of an encumbered line is a call blocking feature where incoming calls are either sent to another number, or a signal is sent to the calling party indicating the unavailability of the called party. While not shown, interface system 602 may send information such that the communication device displays multiple graphs representing times for each day of the week or month that called party 606's line is encumbered.

Preferably called party 606 also may communicate with interface system 602 using screen 614 to select preferences for the encumbered-line bypass feature. A portion of screen 614 includes a list 626 of telephone numbers. Another portion of screen 614 includes pass-codes. In addition to the telephone numbers and pass-codes, additional fields of data may be presented. For example, a name or other detail associated with the phone number or pass-code, as well as other information may also be included, as shown in the example in FIG. 9, screen 614.

As shown in FIG. 9, called party 606 has established certain preferences for his or her encumbered-line bypass list. Specifically, calls from phone numbers 404-555-1111 and 404-555-3333 have been selected as telephone numbers to bypass encumbrances on called party 606's line during certain times of the day or week, shown under "Bypass Times".

Given these preferences, if either a first calling party 620, having a telephone number of 404-555-1111, or a second calling party 622, having a telephone number of 404-555-2222, calls called party 606 at 1 p.m., both will be connected to called party 606 unless called party 606's line is encumbered is some way, for example, if the line is busy. This is because, as shown in graph 624, the called party has not chosen to selectively restrict or otherwise encumber his or her line to prevent unwanted calls at 1 p.m. Because called party 606's line is not encumbered at 1 p.m., first calling party 620 and second calling party 622 may be connected by communications network 608. This is true even though second calling party 622 is not on called party 606's encumbered-line bypass list 626.

As another example, if either the first calling party 620 or the second calling party 622 calls called party 606 at 3 a.m., second calling party 622 will not be connected to called party 606 because called party 606 has selected his or her line to be encumbered at 3 a.m., as shown in graph 624, and because second calling party 622's phone number is not on called party 606's encumbered-line bypass list 626. First calling party 620, however, may be connected because calling party 620's phone number is on encumbered-line bypass list 626, and called party 606 has designated first calling party 620 as a party that should be connected despite encumbrances. Another caller calling from 404-555-3333, shown in list 626, may not be connected by virtue of the phone number from which she called if she calls at 3 a.m., because her bypass times only allow bypass of an encumbrance from 8 a.m. to 10 p.m.

As yet another example, if any calling party, regardless of whether the calling party is or is not on the encumbered-line bypass list, calls called party 606 at 3 a.m. and enters pass-code 44444, they will bypass the encumbrance. Calling parties entering pass-code 22222, however, will only bypass an encumbrance if the encumbrance exists between 8 a.m. and 6 p.m.

Each of these preferences, whether they be set to times of a restricted call reception status (an example of an encumbrance) and a non-restricted call reception status, an on setting or off setting, phone numbers and pass-codes for an encumbered-line bypass list, names and/or details associated with the phone numbers and pass-codes, and the bypass times for each phone number and pass-code, may be modified by the subscriber as set forth in FIG. 10.

FIG. 10 is a flow diagram of a preferred embodiment of a method in accordance with the present invention. This method includes preferred steps of an interface system 602 (see FIG. 9). This method of using an interface system 602 allows a communications network to receive information from a subscriber of restricted status service and encumbered-line bypass feature and/or other services. This communications network may be the communications network discussed above and shown in part in FIG. 6, 7, 8, or 9, or another type of communications network or system. The interface system may be the interface system discussed above and shown in part in FIG. 8, or may be another type of interface system facilitating communication between a communications network and a subscriber.

As part of this preferred embodiment, in step 652 the interface system receives a subscriber's attempt to access a URL to communicate with the communications network. Typically, subscribers attempt to access the URL to update a particular service, but may do so for other reasons. Services may include a restricted status service, another service capable of encumbering a phone line, or another type of service.

Proceeding with the preferred embodiment of the method, in step 654, the interface system prompts a probable subscriber for identifying data. The interface system then receives identifying data. Preferably the home, landline telephone number and corresponding ID code or password from the subscriber are received in step 656. Once the interface system has received the identifying data, the interface system determines if the probable subscriber is a subscriber of the service to which the probable subscriber is attempting to update. Preferably, the interface system does so through a query to an intelligent peripheral in communication with the communications network to validate whether or not the identifying data corresponds with an identifying-data record, step 658. If the probable subscriber is considered to be a valid subscriber, step 660, the preferred method proceeds to step 662.

If the subscriber is not validated to be a valid subscriber of the system, step 660, the interface system returns to step 654 to repeat steps 654, 656, 658, and 660, or denies access to potential the subscriber.

The interface system then sends information to the subscriber regarding that subscriber's current services and preferences. The interface system does so according to step 662 in order to allow the subscriber to review, access, update, and otherwise communicate regarding the service information presented to the subscriber.

Proceeding to step 664, the interface system sends subscriber-based service settings. These service settings can then be displayed, reviewed, and modified by the subscriber. Preferably, these service settings can include stored or default encumbered-line bypass list data, forwarding numbers, pass-codes, and an on or off setting for the entire service. The stored or default encumbered-line bypass list data preferably includes phone numbers and pass-codes stored in the stored encumbered-line bypass list data. In an exemplary embodiment, the stored or default encumbered-line bypass list data is presented to the subscriber through the interface system in an easy-to-update table. These service settings also preferably include applicable categories and/or links. Further, these service settings and/or applicable categories or links data are related to one or more services to which the subscriber subscribes. As part of step 664, the interface system may also send information related to services to which the subscriber does not yet subscribe.

In an exemplary embodiment, the interface system sends one or more call markers relating to one or more telephone calls made from or received by the subscriber to the subscriber through the interface system. Preferably, the call markers include the phone number of one or more parties that called or were called by the subscriber. Also preferably, the call markers include a caller identification of a party that called or was called by the subscriber. The caller identification may include the calling party's name, location from which the calling party called, a timestamp of the time a party called or was called by the subscriber, or otherwise.

This information is provided by the interface system such that the subscriber may access this information through various devices and through a communications network. These various devices may include a computer, a hand-held device, a wireless device or some other device capable of communicating with the interface system. Through making information available to these devices, the interface system may allow the subscriber to easily make changes to the services.

In step 666, the interface system receives desired changes from the subscriber, which may include new data on changes to the subscriber's encumbered-line bypass list, other preferences shown on screen 614, or other preferences and options discussed or implied herein. Preferably, such changes may be completed with a minimum number of keystrokes. In an exemplar embodiment, the subscriber may click on each call marker listed in a table (step 664) to add that phone number to his or her encumbered-line bypass list, along with associated details to an accompanying name/detail list. Also preferably, the interface system allows the subscriber to add services and other features and details. The interface system then waits to receive such changes or an indication that the subscriber has completed his or her communication.

The interface system then, in step 668, checks for errors in the inputs received from the subscriber. After doing so, if there are errors in information input from the subscriber, step 670, the interface system provides feedback, step 672, and performs steps 666, 668, and 670 to receive corrected information. If there are no errors, step 670, the interface system updates the communications network by storing preferences, including the preferences associated with the encumbered-line bypass list, and other data into a database accessible by the communications network, step 674. In an exemplary embodiment, the interface system sends an update to a communications network element, an intelligent peripheral, or an SCP, which then updates the database. After doing so, the interface system logs the subscriber off the interface system, step 676.

Figure 11:
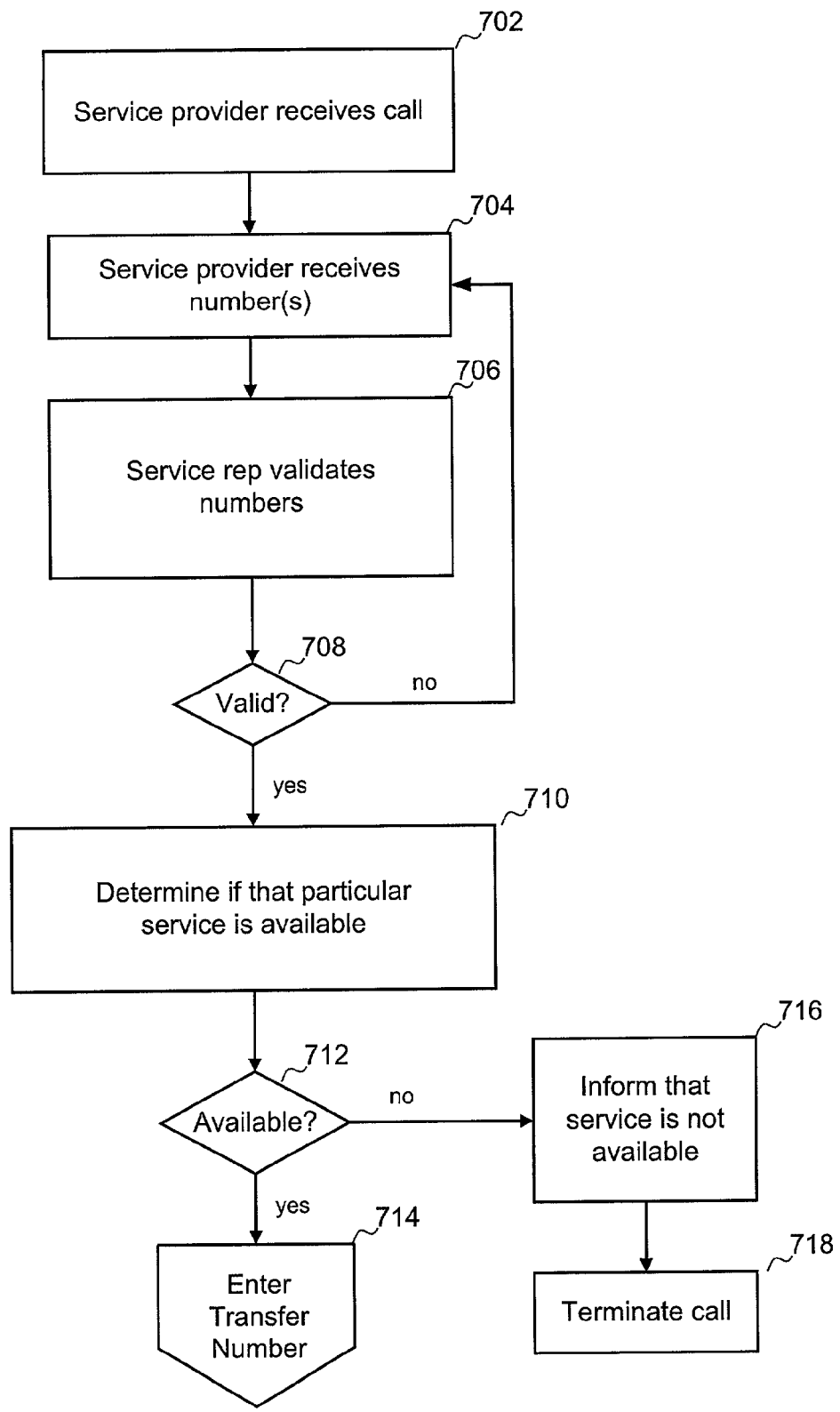
FIG. 11 is a flow diagram of a preferred embodiment of an IVR-based method in accordance with the present invention.
Figure 12:
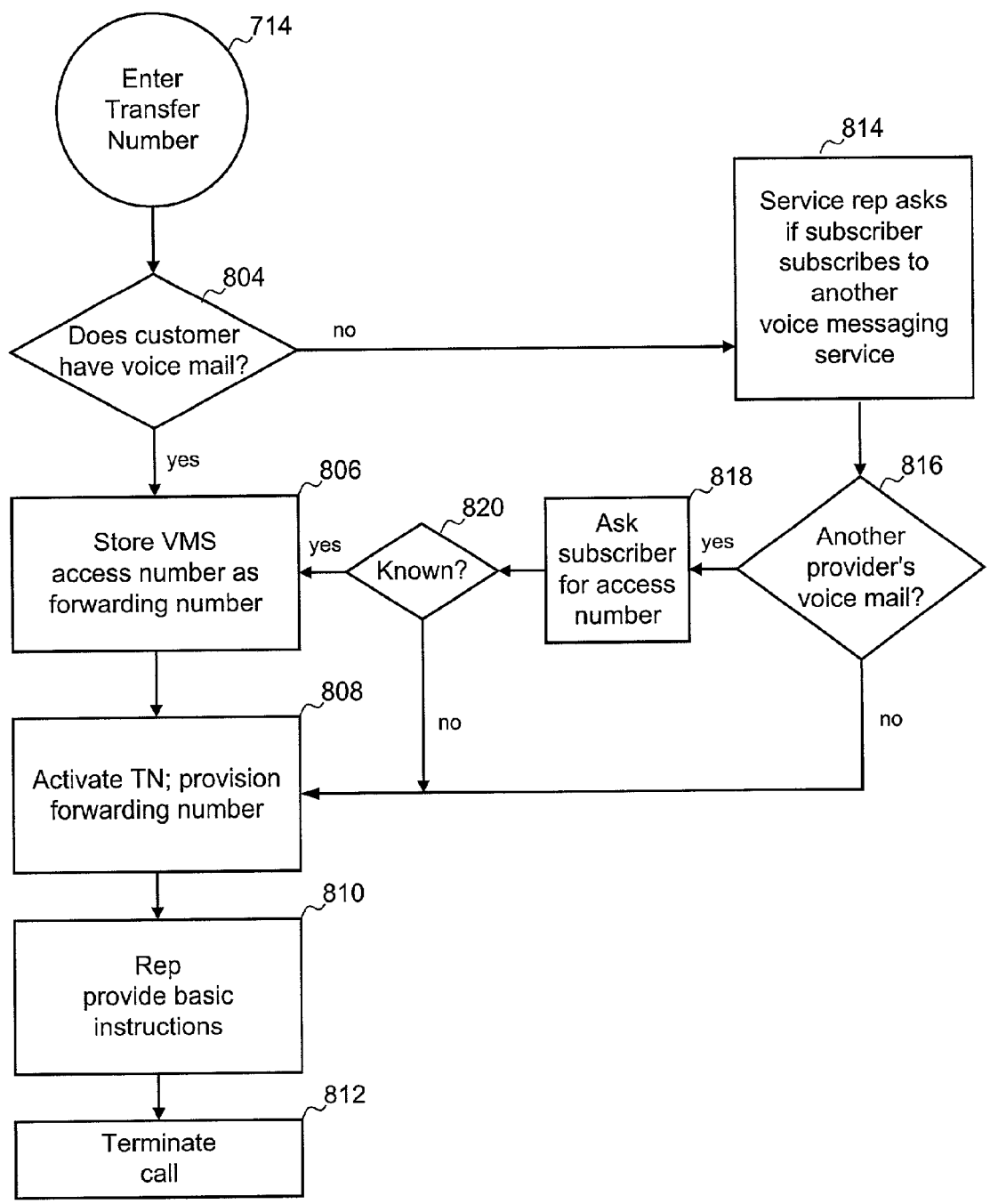
FIG. 12 is a flow diagram of a preferred embodiment of an enter transfer number method in accordance with the present invention.

FIGS. 11 and 12 are flow diagrams showing one example of a preferred embodiment of a method in accordance with the present invention. This example includes operating steps of an interactive voice response (IVR system) system or with human-to-human communication (HTH). Many other manners of using an IVR system with or without HTH may be used in accordance with the preferred embodiment of this method.

As part of this example, the steps shown in FIGS. 11 and 12 may be completed by an agent of the service provider, such as a service representative, or through the IVR system. Preferably, those steps not specifically referring to use of a service representative are completed through the IVR system. This method of using this IVR system and HTH allows a subscriber (or probable subscriber) of restricted status, encumbered-line bypass, and/or other communications network services to receive from and/or input information into a communications network. This communications network may be the communications network discussed above and shown in part in FIG. 6, 7, 8, or 9, or another type of communications network or system.

In step 702, a service provider receives a call from a potential subscriber intending to order or modify service. The service provider then receives information, in some cases, one or more numbers from the potential subscriber 704. These numbers are preferably a landline telephone number and an authorization code from the potential subscriber. After receiving the numbers, the service representative attempt to validate one or more of the potential subscriber's numbers against a subscriber record database, step 706. If the information received is valid, step 708, an attempt is made to validate that the service is available in the subscriber's area, step 710.

The service representative attempts to validate that the service is available in the subscriber's area by comparing the area against a deployment database, step 710. If the service is not available, step 712, the system informs the subscriber that the service is not available, step 716. The service representative then terminates the call from the subscriber, step 718.

If, on the other hand, the service is available, step 712, the service representative asks that the subscriber enter a transfer number, according to the method set forth after step 714 (see FIG. 12).

Continuing with the preferred embodiment from step 714, FIG. 12 sets forth a preferred embodiment of a method to enter a transfer number. Entering a transfer number may be performed in other ways as well. In this embodiment, however, the service provider receives the transfer number entered by the subscriber, according to the method set forth after step 714.

If the subscriber does subscribe to the service provider's voice messaging service, step 804, the service provider stores the voice messaging service (VMS) access number as a forwarding number. Preferably the service provider performs step 802 via a computer query to a database. If the subscriber does not, step 804, the service representative asks the subscriber if the subscriber subscribes to another service provider's voice messaging service, step 814.

If the subscriber subscribes to another provider's voice-mail, step 816, the service provider asks the subscriber for the appropriate number, step 818. If the service provider receives the access number from the subscriber, step 820, the service provider then proceeds according to step 806. In step 806, the service provider stores the voice-messaging service access number as the forwarding number.

If, on the other hand, the service provider does not receive an access number from the subscriber, step 816, the service provider proceeds according to step 808.

In step 808, the service provider activates the transfer number and activates the service for the subscriber's landline telephone number. The service provider preferably activates the transfer number in a communications network element, such as a service node. If the voice mail number or voice mail access number is not received, the service provider activates the number of a service node. In an exemplary embodiment, the forwarding number is a special number the service provider uses to transfer calls to a service node.

Then the service provider, in step 810, provides basic service instructions as to how the subscriber is to update the service. After so providing basic instruction, the service provider terminates the call with the subscriber, step 812.

FIGS. 13–16 are flow diagrams showing examples of preferred embodiments of a method in accordance with the present invention. These figures and the description set forth below describe a method whereby an Interactive Voice Response (IVR) system interacts with a subscriber.

This method of using this IVR system allows a subscriber of network services, including, for example, restricted status or encumbered-line bypass, to interact with a service provider. This communications network may be the communications network discussed above and shown in part in FIG. 6, 7, 8, or 9, or another type of communications network or system benefiting from input or output through an IVR system.

In step 1002 the IVR system receives identifying data from the subscriber. Preferably this data is based on the phone number from which the subscriber is calling, or a subscriber-code that the subscriber enters. After receiving the identifying data from the subscriber, the IVR system validates, in step 1004, the subscriber as a subscriber of a service by comparing the identifying data with an identifying-data record. The identifying-data record is preferably stored in a database accessible by the communications network.

If the IVR system validates the subscriber, the IVR system proceeds to main menu step 1008. In step 1008 the IVR system prompts the subscriber and preferably provides the following choices: (1) turn the service on or off; (2) set schedule for the service; (3) set encumbered-line bypass list; or (4) select a forwarding number. Preferably, these choices are associated with appropriate digits, digits 1 through 4 are given as one possible example.

If the IVR system receives a one digit from the subscriber according to step 1010, the IVR system performs a query to determine the service status step 1012. The IVR system, once it has determined the service status, announces the status to the subscriber according to step 1014. After announcing the status, the IVR system sends this new status to the communications network, preferably to an intelligent peripheral of the communications network, and in an exemplary embodiment an SCP, according to step 1016. The IVR system then returns, in step 1018, to the main menu 1008.

With the above steps proceeding from step 1008 described, the following sets forth another set of steps potentially proceeding from step 1008. If the IVR system receives a two-digit 1020, the IVR system proceeds to step 1022. The IVR system queries the communications network, preferably an intelligent peripheral of the communications network, and in an exemplary embodiment an SCP of the communications network, to retrieve the appropriate schedule. The IVR system then proceeds to step 1024. If the schedule exists, the IVR system proceeds to step 1026. If it does not then the IVR system proceeds to step 1036 in order for the IVR system to receive numbers entered by the subscriber.

If the schedule exists, according to step 1024, the IVR system plays the schedule, step 1026, to the subscriber. The IVR system then prompts the subscriber to either keep or change the schedule that has just been played back to the subscriber, step 1028.

The IVR system waits to receive and then receives and collects a digit from the subscriber, either one or two in this case, step 1030. If the IVR system receives or collects a one-digit, step 1032, the IVR system returns to the main menu, step 1018. If the IVR system collects a two-digit according to step 1034 it proceeds to step 1036.

With the above steps proceeding from step 1008 described, the following sets forth another set of steps potentially proceeding from step 1008. If the IVR system receives a three-digit, step 1038, the IVR system queries the communications network for the encumbered-line bypass list according to step 1040. Preferably the IVR system queries an intelligent peripheral of the communications network. In an exemplary embodiment the IVR system queries an SCP of the communications network to retrieve the appropriate encumbered-line bypass list. After step 1040, the IVR system proceeds step 1042, described in FIG. 15.

With the above steps proceeding from step 1008 described, the following sets forth another set of steps potentially proceeding from step 1008. If the IVR system receives a four-digit, the IVR system queries the communications network for a transfer number in step 1046. Preferably the IVR system queries an intelligent peripheral of the communications network. In an exemplary embodiment the IVR system queries an SCP of the communications network. After step 1046, if a number does not exist in step 1048, the IVR system proceeds to step 1062.

If the number does exist, the IVR system plays the number to the subscriber, step 1050. After playing the number, the IVR system, according to step 1052, prompts the subscriber to keep or change the number. The IVR system then waits to receive, for example, either a one-digit or a two-digit from the subscriber, according to step 1054. If the IVR system receives a one-digit from the subscriber, step 1056, the IVR system returns to the main menu according to step 1058. If the IVR systems receives and/or collects a digit according to step 1054 and if the digit is two-digit, step 1060, the IVR system proceeds to step 1062, which leads to FIG. 14 discussed below.

Figure 13:
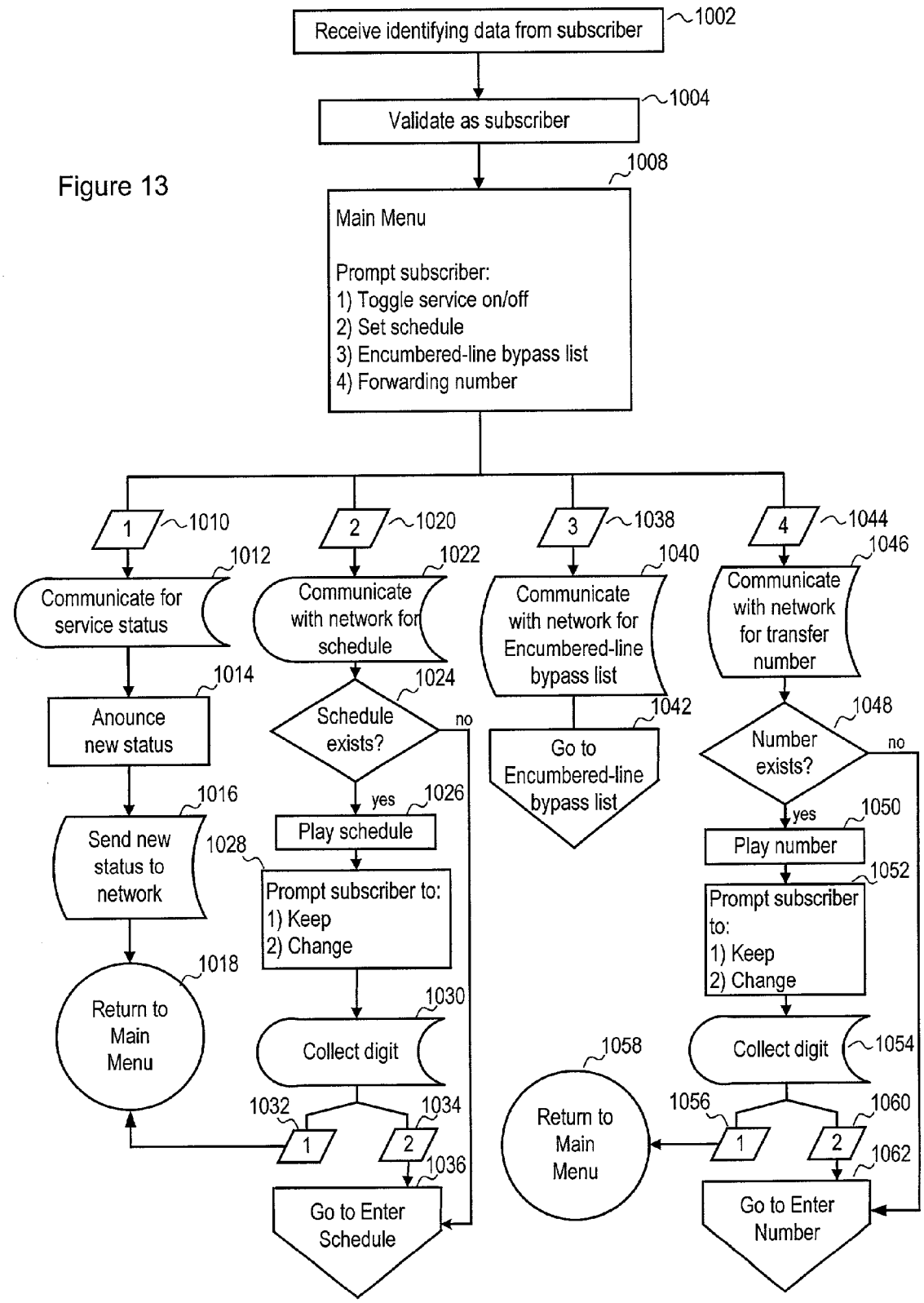
FIG. 13 is a flow diagram of a preferred embodiment of an IVR-based method in accordance with the present invention.
Figure 14:
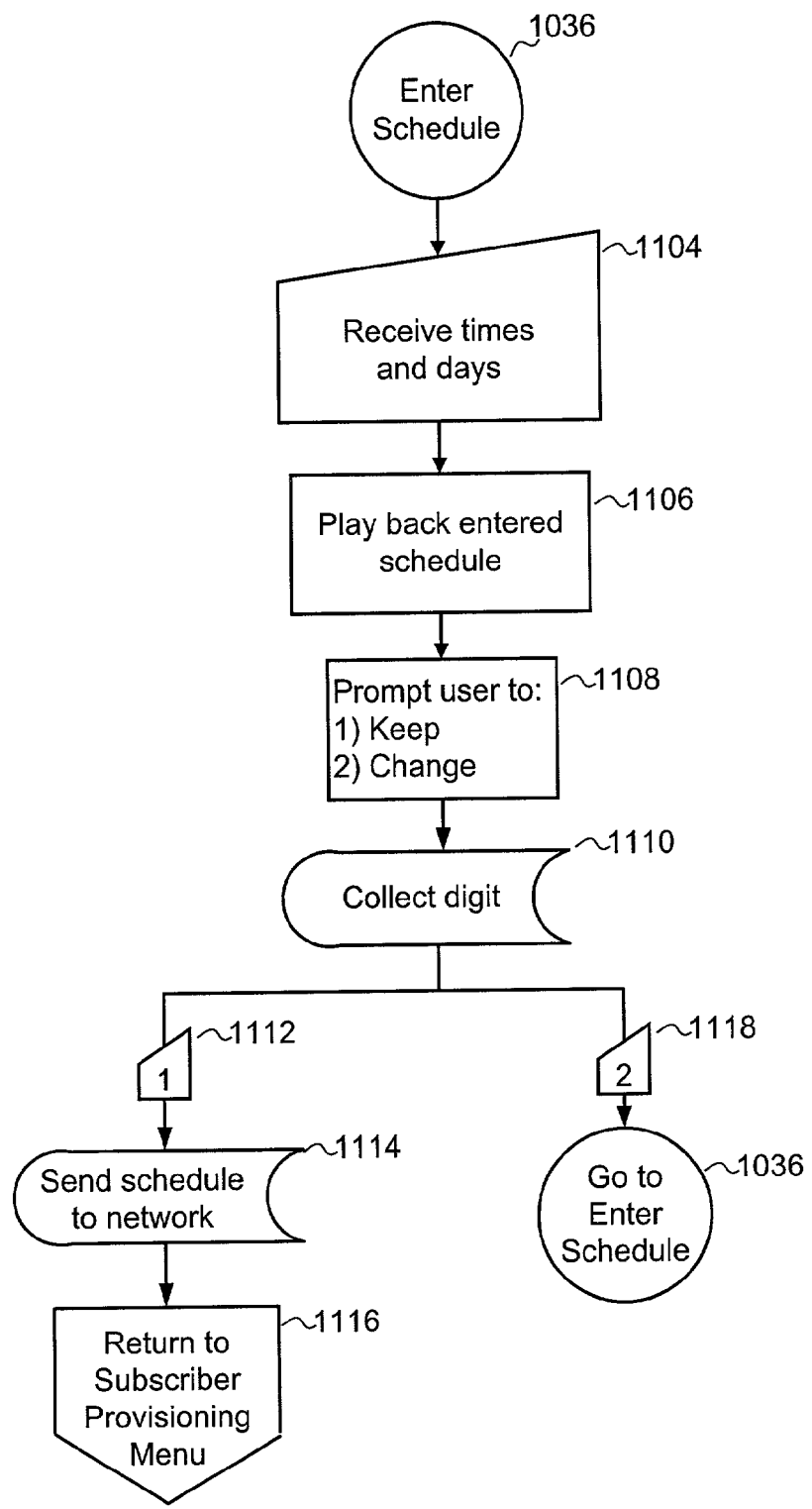
FIG. 14 is a flow diagram of a preferred embodiment of an enter schedule method for an IVR-based method in accordance with the present invention.

FIG. 14 shows a flow diagram of an embodiment of a method in accordance with the present invention. The method set forth in FIG. 14 represents a preferred embodiment of a method whereby an interactive voice response system asks for and receives a schedule. In step 1036, which is also shown in FIG. 13, the IVR system receives a schedule entered by the subscriber. The IVR system, according to step 1104, communicates with the subscriber, receiving, waiting and/or prompting the subscriber to enter start and stop times and days. With this information, the IVR system plays back the stop and start times and days and other information in step 1106. In step 1108, the IVR system prompts the subscriber to keep or change or otherwise edit the start and stop times and days and other information played back according to step 1106. In step 1110 the IVR system collects digits, for example a one-digit for keep and a two-digit for change.

If the IVR system receives a one-digit from the subscriber, step 1112, the IVR system communicates the schedule received by the IVR system in step 1104 to the communications network, step 1114. Preferably, the IVR system communicates the schedule to one or more communications network elements, such as an intelligent peripheral. In an exemplary embodiment, the IVR system communicates the schedule to an SCP. After performing this step, the IVR system returns the subscriber to the provisioning menu, step 1116 (back to step 1008).

If, in step 1110 the IVR system collects a two-digit 1118, the IVR system proceeds to enter schedule step 1036, and the process begins again.

Figure 15:
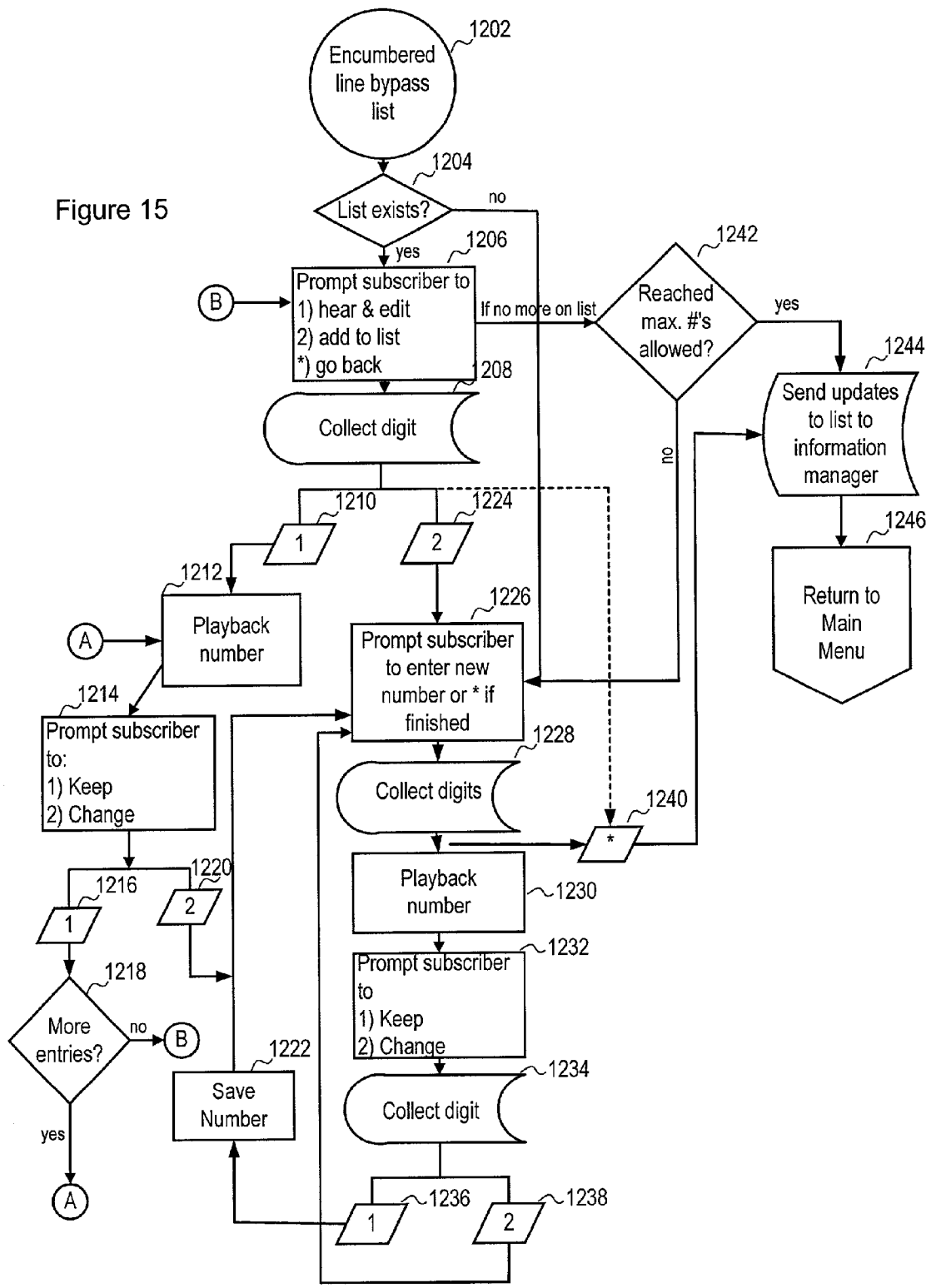
FIG. 15 is a flow diagram of a preferred embodiment of an encumbered-line bypass list method for an IVR-based method in accordance with the present invention.

FIG. 15 is a flow diagram of a preferred embodiment of a method in accordance with the present invention. The method shown in FIG. 15 is, in part, a process whereby an IVR system interacts with a subscriber and a communications network. Preferably this method can be used to facilitate receipt, by the communications network from the subscriber, of information related to additions, deletions, or adjustments on that subscriber's encumbered-line bypass list.

After performing step 1042 of FIG. 13, the IVR system proceeds with step 1202 of FIG. 15. In step 1204 the IVR system determines whether or not an encumbered-line bypass list exists. If the encumbered-line bypass list does not exist, the IVR system proceeds according to step 1226, prompting the subscriber to enter a new number or a star-digit if the subscriber is finished. If the encumbered-line bypass list does exist, step 1204, the IVR system proceeds to step 1206 where the system prompts the subscriber to choose by input of a digit, to hear and edit numbers currently contained within the subscriber's encumbered-line bypass list, to add numbers to the subscriber's encumbered-line bypass list, or to go back.

In step 1206, if the IVR system receives, for example, a one-digit, the IVR system collects that digit according to step 1208, proceeds to step 1210, and then to step 1212 where it plays back the phone numbers in the encumbered-line bypass list. As part of step 1212, the IVR system preferably guides the subscriber by presenting each of the phone numbers or pass-codes within the encumbered-line bypass list to the subscriber in order. The IVR system can also include particular details. These particular details could, for example, include information such as the name of the person associated with the phone number. The name of the person could be associated with the number by public record, by receipt from the person having such number, by receipt from the subscriber, by having been previously received from the subscriber and stored in information manager 610 or database 502, or by some other means.

In step 1214 the IVR system prompts the subscriber to keep or change a particular phone number or pass-code in the encumbered-line bypass list. Preferably the IVR system also prompts the subscriber to edit the phone numbers and pass-codes and associated details that are on the subscriber's encumbered-line bypass list.

If the IVR system receives, for example, a one-digit from the subscriber according to step 1216, the IVR system proceeds to step 1218. If there are more entries received from the subscriber, step 1218, the IVR system returns to step 1212, playing back telephone numbers and pass-codes in the encumbered-line bypass list and again proceeding through steps 1212, 1214 and so on. If there are no more entries received from the subscriber, step 1218, the IVR system returns to step 1206.

If, after prompting the subscriber according to step 1214, the IVR system receives a two-digit from the subscriber according to step 1220, the IVR system proceeds to step 1226. Step 1226 will be discussed below.

With the above steps proceeding from step 1206 described, the following sets forth another set of steps potentially proceeding from step 1206. As set forth above, the IVR system prompts the subscriber according to step

1206. If the IVR system receives a two-digit, for example, rather than a one-digit as set forth above, the IVR system collects that digit according to step 1208 and proceeds to step 1224 and then to step 1226. In step 1226 the IVR system prompts the subscriber to enter new phone numbers and pass-codes to add to the subscriber's encumbered-line bypass list, and preferably associated details for those numbers, or to enter a star-digit if the subscriber is finished.

From step 1226, the IVR system collects digits from the subscriber according to step 1228. If the IVR system collects a phone number or pass-code, the IVR system plays such number back to the subscriber, step 1230. After playing back the number according to step 1230 the IVR system prompts the subscriber to either keep or change the phone number or pass-code that the subscriber just entered, step 1232.

In step 1234 the IVR system collects, for example, either a one-digit or a two-digit from the subscriber. In cases where the IVR system collects the one-digit, step 1236, it then saves the phone number or pass-code that the subscriber previously entered, step 1222. Preferably it saves the phone number or pass-code by storing it with the encumbered-line bypass list in a database accessible by a communications network. Also preferably, the IVR system updates the encumbered-line bypass list when it receives changes to the phone numbers and pass-codes. In cases where the IVR system collects the two-digit, step 1238, the IVR system proceeds to step 1226.

Preferably, the IVR system then allows the subscriber to continue to input numbers until the phone numbers and pass-codes are correct and continue to be able to keep correcting them or allowing the subscriber to continue entering additional phone numbers and pass-codes into the encumbered-line bypass list until the subscriber is satisfied, either by the process described in FIG. 15 or some other similar process.

If, after prompting the subscriber according to step 1226, the IVR system receives an asterisk from the subscriber, step 1228, the IVR system proceeds to step 1240, then proceeds to step 1244. In step 1244, the IVR system sends updates to the phone numbers and pass-codes, associated details, or other information to the information manager. Preferably the IVR system also sends the update to an intelligent peripheral of the communications network. In an exemplary embodiment, the IVR system sends an update list to an SCP of the communications network. After so doing, the IVR system returns to the main menu, step 1246.

In step 1228 the IVR system collects whatever digits have been entered by the subscriber. If the subscriber has entered an asterisk, step 1240, the IVR system proceeds to step 1244. If the IVR system has proceeded to step 1244 it sends an update list to the information manager. After setting an update according to step 1244, the IVR system then returns the subscriber to the main menu in step 1246.

Returning to step 1206. In cases where the IVR system has been requested to play back the phone numbers and pass-codes on the subscriber encumbered-line bypass list and every number in the subscriber encumbered-line bypass list has been played back to the subscriber, the IVR system proceeds to step 1242.

In step 1242 the IVR system, if it does not reach the maximum number of phone numbers and pass-codes in an encumbered-line bypass list, returns to step 1226. In cases where the maximum number of phone numbers and pass-codes that is allowed in the encumbered-line bypass list has been reached, the IVR system, according to step 1242 proceeds to step 1244. The system then updates the communications network according to step 1244 and returns the subscriber to the main menu, step 1246.

With the above steps proceeding from step 1206 described, there is another set of steps potentially proceeding from step 1206. As set forth above, the IVR system prompts the subscriber according to step 1206. If the IVR system receives an asterisk, step 1208, the IVR system proceeds along the dash-line from after step 1208 to step 1240. The IVR system then proceeds according to step 1244 as described above.

Figure 16:
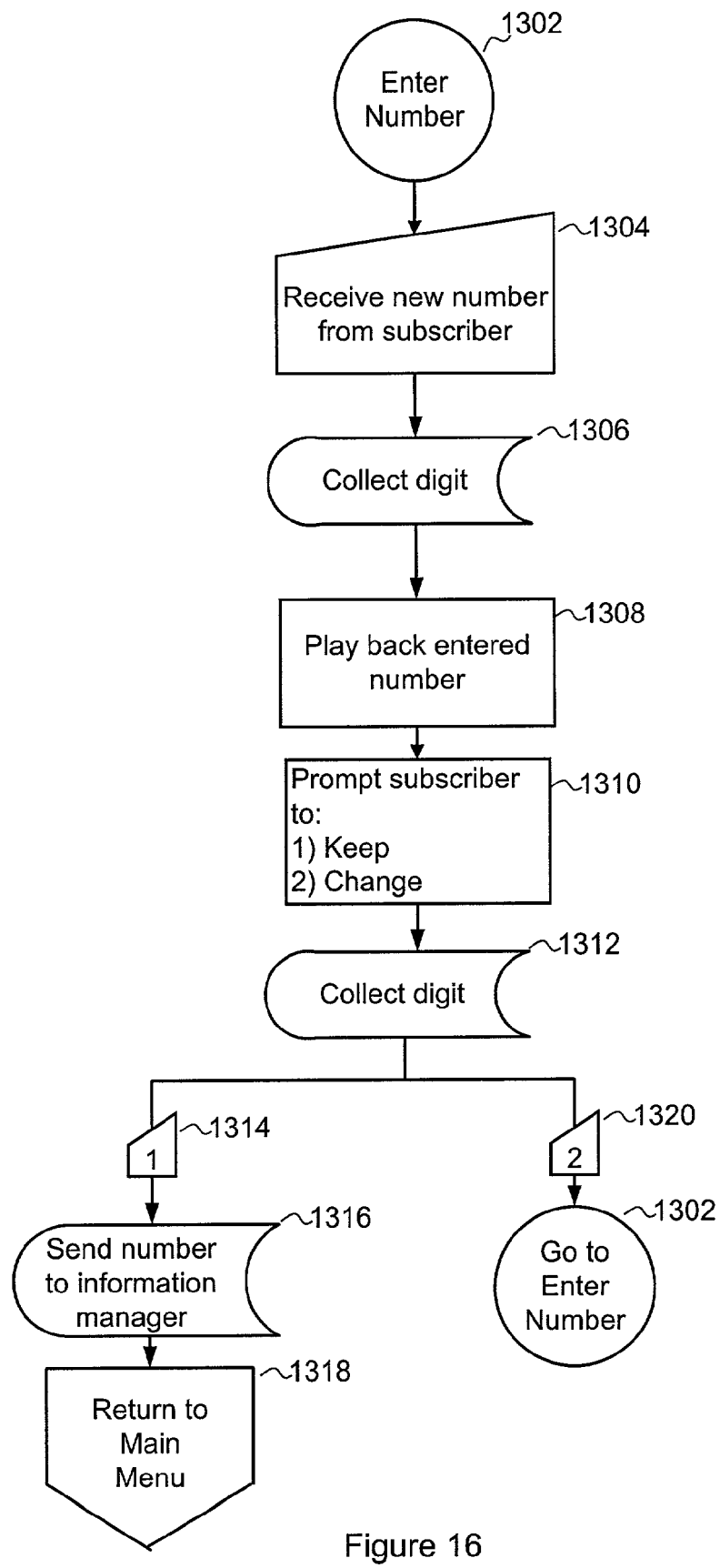
FIG. 16 is a flow diagram of a preferred embodiment of an enter number method for an IVR-based method in accordance with the present invention.

FIG. 16 shows a flow diagram of a preferred embodiment of a method in accordance with the present invention. The method set forth in FIG. 16 is a preferred embodiment of a method whereby an interactive voice response system receives a new or modified forwarding number. In step 1302 the IVR system prompts the subscriber to enter a new or modified forwarding number. In step 1304 the IVR system receives one or more numbers input from the subscriber. Once this IVR system has received these numbers the IVR systems collects the numbers, preferably digit-by-digit, according to step 1306. The IVR system then plays back the numbers entered by the subscriber according to step 1308 to confirm correct entry.

In step 1310 the IVR system prompts the subscriber to keep (in this example a one-digit) or change (in this example a two-digit) the information that was communicated back to the subscriber in step 1308. In step 1312 the IVR system collects a one-digit or a two-digit, per this example. If the IVR system receives a one-digit, step 1314, the IVR system communicates the number to the information manager, step 1316. Preferably, the IVR system communicates the number to an intelligent peripheral of the communications network. In an exemplary embodiment, the IVR system communicates the number to an SCP of the communications network. After sending the number to the information manager the IVR system returns the subscriber to the main menu in step 1318.

If the IVR system receives a two-digit from the subscriber, however, step 1320, the IVR system proceeds to step 1302, and returns the subscriber to the beginning.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for establishing preferences for a communications service and for providing the communications service comprising the steps of:
   receiving identifying data from a probable subscriber of a service through computer interface system;
   determining if the probable subscriber is a valid subscriber by comparing the identifying data to an identifying-data record;
   if the probable subscriber is a valid subscriber, sending stored and default information to the subscriber through the computer interface system, wherein the stored and default information is displayed to the subscriber on a graphical user interface (GUI) executing on a computer and comprises at least encumbered-line bypass list data, forwarding numbers, an on/off setting for the entire communications service and links to one or more other available services, wherein further the encumbered-line bypass list data comprises bypass times for one or more phone numbers and one or more pass-codes;
   receiving a second item of information from the subscriber through the computer interface system, wherein the second item of information is related to a calling party that has been preselected to by-pass an encumbered line; and
   storing the second item of information in a database accessible by a communications network thereby updating the stored and default information.

2. The method of claim 1, further comprising the step of sending at least one call marker, relating to at least one telephone call made from the subscriber, to the subscriber by the computer interface system.

3. The method of claim 2, wherein the call markers include a phone number of a party called by the subscriber.

4. The method of claim 2, wherein the call marker includes a caller identification of a party that called the subscriber.

5. The method of claim 2, wherein the call marker includes a timestamp related to a time a party was called by the subscriber.

6. The method of claim 1, wherein the step of sending default information to the subscriber through the computer interface system further comprises the step of sending one or more phone numbers or pass-codes stored in an encumbered-line bypass list to the subscriber through the computer interface system.

7. A method for receiving encumbered-line bypass list information through an IVR system, comprising the steps of:
   receiving identifying data from a probable subscriber of a service through an IVR system;
   determining if the probable subscriber is a valid subscriber by comparing the identifying data to an identifying-data record;
   providing an option choice to the subscriber comprising toggling the service between on and off, setting a schedule for the service, setting an encumbered-line bypass list and selecting a forwarding number;
   if setting a schedule for the service is selected, then playing the schedule to the subscriber through the IVR system, wherein the subscriber sets a time of day during which encumbrance-line bypass list is enabled;
   if setting an encumbered-line bypass list is selected, then playing information in the encumbered-line bypass list to the subscriber through the IVR system;
   receiving modifications to the encumbered-line bypass list information from the subscriber through the IVR system; and
   storing the modified encumbered-line bypass list information in a database accessible by a communications network.

8. The method of claim 7, wherein the encumbered-line bypass list information is related to at least one calling party preselected by the subscriber to bypass an encumbrance on the subscriber's line.

9. A method of connecting a calling party with a called party comprising the steps of:
   receiving a call from a calling party over a telecommunications system which includes a database containing subscriber information, wherein the subscriber information includes an encumbered-line bypass list of phone numbers;
   determining that a line associated with the called party is encumbered;
   communicating one or more identifiers related to the calling party to the called party where the identifiers are presented to the called party and wherein further the identifiers include the calling party's phone number, the calling party's name, the time the calling party called, pass-code and any additional information input by the calling party including audible input;
   querying the database for the called party's call reception status, wherein if the call reception status is a restricted status then the call is connected to a third party and if the call receptions status is not a restricted status then the call is placed to the called party, wherein the method further comprises determining whether an instruction is received from the called party to set the call reception status to a restricted status after the one or more identifiers are received by the called party;
   if the call reception status is set to a restricted status, comparing one or more identifiers of the calling party with the encumbered-line bypass list of phone numbers; and
   if one of the identifier(s) of the calling party matches an identifier in the encumbered-line bypass list, then connecting the calling party to the called party by bypassing the encumbrance unless the called party has prevented the call from bypassing a restricted status by imposing a restriction on all calls based on time of day.

10. The method of claim 9 further comprising the steps of:
    contacting the called party to determine if the called party wishes to receive a call from the calling party; and
    receiving, from the called party, an assent for the communications network to connect the calling party to the called party.

11. The method of claim 10, wherein the step of contacting the called party to determine if the called party wishes to receive the call of the calling party is in the form of a text-based message.

12. The method of claim 11, wherein the step of receiving, from the called party, an assent for the communications network to connect the calling party to the called party is received as a text-based response to the text-based message.

13. The method of claim 12, wherein the communications network first disconnects the called party from a third party prior to connecting the calling party to the called party.

14. The method of claim 10, wherein the step of contacting the called party to determine if the called party wishes the communications network to connect the calling party to the called party is performed by the communications network through an audible message.

15. The method of claim 14, wherein the step of receiving from the called party an assent for the communications network to connect the calling party to the called party is received by the communications network through an audible response.

16. The method of claim 9, wherein the called party is permitted to change the encumbered-line bypass list by calling a number and communicating with the communications network by communicating with an interactive voice response system to modify the encumbered-line bypass list.

17. The method of claim 9, wherein the called party is permitted to change the encumbered-line bypass list by communicating with an interface system to modify the encumbered-line bypass list.

18. A method of directing a call comprising the steps of:
receiving a call from a calling party;
determining the identity of a called party;
communicating one or more identifiers related to the calling party to the called party where the identifiers are presented to the called party and wherein further the identifiers include the calling party's phone number, the calling party's name, the time the calling party called, pass-code and any additional information input by the called party including audible input;
comparing one or more identifiers of the calling party with information received from the called party;
querying the database for the called party's call reception status, wherein if the call reception status is a restricted status then the call is connected to a third party and if the call receptions status is not a restricted status then the call is placed to the called party, wherein the method further comprises determining whether the called party has set the call reception status to a restricted status after the one or more identifiers are received by the called party; and
connecting the call to the called party if one of the identifier(s) corresponds to the information received from the called party, unless the called party has prevented the call from bypassing a restricted status by imposing a restriction on all calls based on time of day, and connecting the call to a third party if none of the identifier(s) corresponds to the information received from the called party.

19. The method of claim 18, wherein the identifier(s) are associated with the calling party.

20. The method of claim 19, wherein one of the identifier(s) is the phone number from which the calling party called and the information received from the called party comprises an encumbered-line bypass list.

21. The method of claim 20, wherein one of the identifier(s) is communicated to the communications network as part of the call.

22. The method of claim 18, wherein one of the identifier(s) is received from the calling party.

23. The method of claim 22, wherein one of the identifier(s) is a pass-code and the information comprises one or more pass-codes on an encumbered-line bypass list.

24. The method of claim 23, wherein the third party plays an automated announcement to the calling party.

* * * * *